United States Patent [19]
Ohtomo et al.

[11] Patent Number: 5,936,721
[45] Date of Patent: Aug. 10, 1999

[54] GUIDE BEAM DIRECTION SETTING APPARATUS

[75] Inventors: Fumio Ohtomo; Kunihiro Hayashi; Kenichiro Yoshino, all of Tokyo, Japan

[73] Assignee: Kabushiki Kaisha Topcon, Tokyo, Japan

[21] Appl. No.: 08/827,109

[22] Filed: Mar. 17, 1997

[30] Foreign Application Priority Data

Mar. 18, 1996 [JP] Japan ................................. 8-061271
Jun. 24, 1996 [JP] Japan ................................. 8-162587

[51] Int. Cl.⁶ ....................................... G01B 11/26
[52] U.S. Cl. .................. 356/138; 356/400; 356/141.3; 356/153; 33/286
[58] Field of Search .................... 356/399, 150, 356/138, 400, 139.03, 141.3, 141.5, 153; 33/285, 286

[56] References Cited

U.S. PATENT DOCUMENTS 4,175,861 11/1979 Kottas ..................................... 356/153

Primary Examiner—Robert H. Kim
Assistant Examiner—Zandra V. Smith
Attorney, Agent, or Firm—Foley & Lardner

[57] ABSTRACT

A guide beam direction setting apparatus of the present invention has a guide beam generator (12) having a guide-beam emission optical system (14) for emitting a guide beam (P), an indicator-beam emission optical system (15) for emitting an indicator beam (K), and detection units (23) for detecting the indicator beam. The indicator beam (K) is a beam which has a flat spatial spread in the emission direction of the guide beam. The detection units (23) are disposed so that they correspond to the collimation direction (L) of a collimation direction unit (11) and that they are spaced from the indicator-beam emission optical system (15), and the emission direction of the guide beam (P) is aligned with the collimation direction (L) by detecting the indicator beam (K) with the detection units (23).

20 Claims, 24 Drawing Sheets

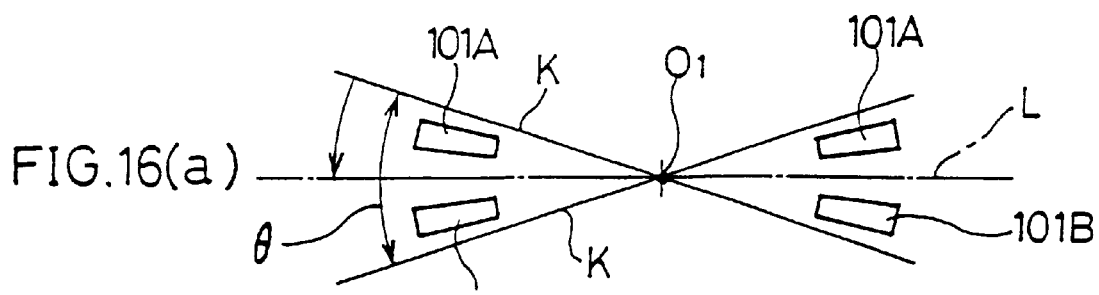
FIG. 16(a)
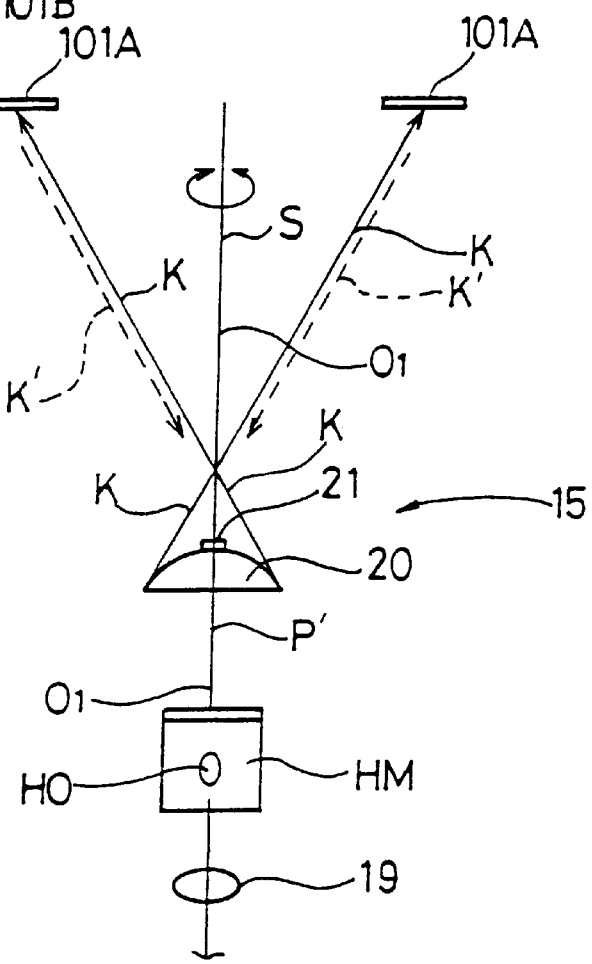
FIG. 16(b)
FIG. 16(c)
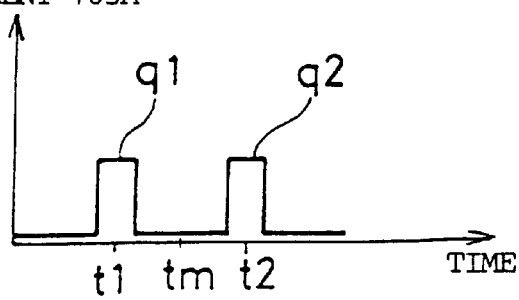

DETECTED OUTPUT OF
LIGHT RECEIVING
ELEMENT 103A

DETECTED OUTPUT OF
LIGHT RECEIVING
ELEMENT 103A

FIG. 27
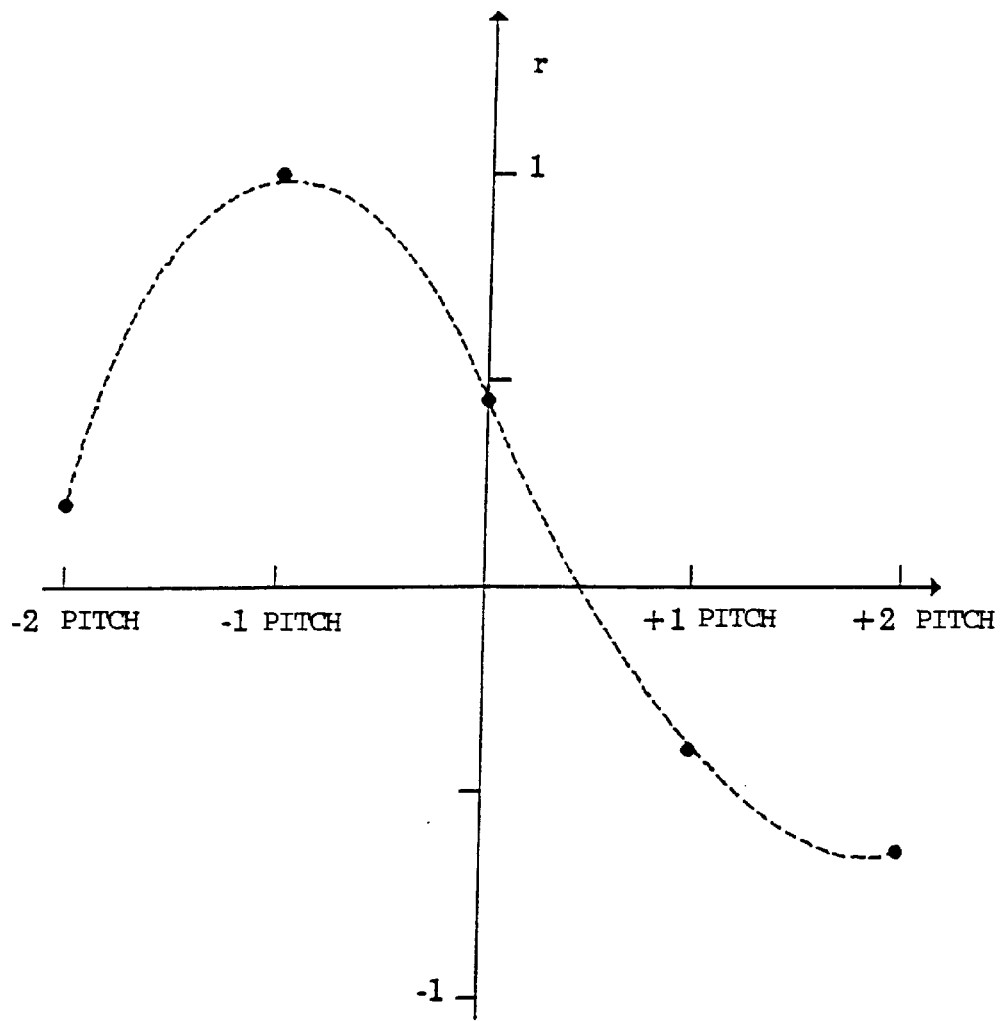
POSITIONAL RELATIONSHIP BETWEEN Sx AND Sy
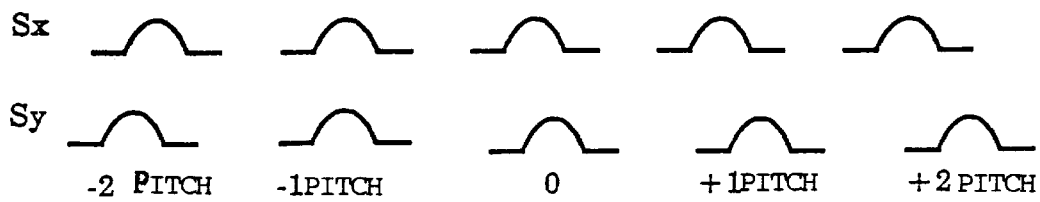

CYLINDRICAL LENS 20

GUIDE BEAM DIRECTION SETTING APPARATUS

BACKGROUND OF THE INVENTION

1. Field of the Invention

The present invention relates to a guide beam direction setting apparatus which aligns the direction of emission of the guide beam emitted from a guide beam generator with the direction of collimation of a survey to prescribe the emission direction of the guide beam, and more particularly to a guide beam direction setting apparatus capable of application to a tunnel digging operation.

2. Description of Related Art

There is a method of tunnel construction which lays pipes, such as Hume concrete pipes and metallic steel pipes, at a position of fixed depth from the ground. As this construction method, there is known an open cut method according to which piping grooves are dug at a position of fixed depth from the ground and pipes are laid. There is also known a dig propulsion method according to which piping tunnels are dug at a place of fixed depth from the ground and pipes are connected in sequence by press fitting. In these construction methods a survey is made in order to determine the direction in which the pipes are laid.

FIG. 1 schematically illustrates a conventional guide beam direction setting apparatus for determining the direction in which the pipe is laid. In the figure, reference numeral 1 denotes a vertical pit, reference numeral 2 a surveying machine, such as a theodolite, installed on the ground surface GL, and reference numeral 3 a surveying machine installed at a place of fixed depth from the ground. The surveying machine 2 is employed as a collimation direction means.

A hanging frame 4 is installed on the ground surface GL as a plumb-bob device. The hanging frame 4 hangs two weights 6 thereon with two suspension wires 5. The two suspension wires 5 are tensioned by the weights 6 so that they become parallel with each other. The weight 6 is immersed into liquid 7, such as oil having a high viscosity, in order to prevent the oscillation of the suspension wire 5, such as lateral and vertical swings.

An operator determines a direction of collimation L in accordance with a pipe laying plan and operates the hanging frame 4 so that the two suspension wires 5 are superimposed and seen as a signal wire. In this way, an imaginary plane including the collimation direction L is formed. For example, a theodolite or a level is employed as the surveying machine 3. The surveying machine 3 adjusts collimation so that the suspension wires 5 are seen as being superimposed. In this way, the collimation direction L as viewed on the ground is aligned with the collimation direction as viewed underground. This collimation direction is assumed to be a digging direction.

Also, if there is provided a guide beam generator which emits a guide beam in a direction aligning with the collimation direction of the surveying machine 3, the digging direction can be prescribed based on the direction of emission of the guide beam. If the digging operation of the tunnel 8 is performed based on the collimation direction of this surveying machine 3 (or the guide beam), pipe laying can be performed according to plans.

However, the conventional direction setting apparatus, where the collimation direction of the surveying machine 3 (or the emission direction of the guide beam) and the collimation direction L are aligned with each other by making use of a plumb-bob device, is on an elaborate scale. In addition, the operation of aligning the collimation direction (or the emission direction of the guide beam) with the collimation direction L takes time. Furthermore, in this conventional direction setting apparatus, the size of the vertical pit 1 is restricted from recent road circumstances and therefore the base length (i.e., interval between two suspension wires 5) cannot be freely enlarged. Therefore, if the copying of the survey is made from the ground surface GL to the pit 1 and from the pit 1 to the tunnel 8, cumulative error will become significant.

SUMMARY OF THE INVENTION

The present invention has been made in view of the aforementioned problems.

Accordingly, it is an objective of the present invention to provide a guide beam direction setting apparatus which is capable of easily and quickly aligning the emission direction of a guide beam with the collimation direction of a survey.

Another objective of the present invention is to provide a guide beam direction setting apparatus where cumulative error is small.

To achieve the foregoing objectives, a guide beam direction setting apparatus according to a first aspect of the present invention comprises: a guide beam generator having a guide-beam emission optical system for emitting a guide beam of light; an indicator-beam emission optical system for emitting an indicator beam of light having a flat spatial spread, the indicator-beam emission optical system having a semiconductor laser wherein a direction in which a spreading angle of a laser beam is large corresponds to an emission direction of the guide beam; and detection means for detecting the indicator beam. The detection means is disposed so as to correspond to a collimation direction of collimation direction means and be spaced from the indicator-beam emission optical system, and the emission direction of the guide beam is aligned with the collimation direction by detecting the indicator beam with the detection means.

A guide beam direction setting apparatus according to a second aspect of the present invention comprises: a guide beam generator having a guide-beam emission optical system for emitting a guide beam of light; an indicator-beam emission optical system for emitting an indicator beam of light having a flat spatial spread, the indicator-beam emission optical system having a semiconductor laser wherein a direction in which a spreading angle of a laser beam is large corresponds to a collimation direction; and detection means for detecting the indicator beam. The detection means is disposed so as to correspond to an emission direction of the guide beam and be spaced from the indicator-beam emission optical system, and the emission direction of the guide beam is aligned with the collimation direction by detecting the indicator beam with the detection means.

In the guide beam direction setting apparatus according to the first aspect of the present invention, the indicator-beam emission optical system is provided in the guide beam generator, and the detection means is provided integrally with the collimation direction means. In the guide beam direction setting apparatus according to the second aspect of the present invention, the indicator-beam emission optical system is provided integrally with the collimation direction means, and the detection means is provided integrally with the guide beam generator. Preferably, the indicator-beam emission optical system vertically emits the indicator beam, and more preferably, the indicator beam includes a spot beam which prescribes the center of an optical axis.

In the guide beam direction setting apparatus according to the first aspect of the present invention, the indicator beam is seen as linearly extending in the emission direction of the guide beam when viewed from the side where the collimation direction means is disposed. In the guide beam direction setting apparatus according to the second aspect of the present invention, the indicator beam is seen as linearly extending in the collimation direction when viewed from the side where the guide beam generator is disposed.

Preferably, the optical indicator-beam emission system is provided with a diaphragm plate having a slit for diffracting the laser beam, and the slit extends long in the collimation direction and is disposed in the rear of or in front of a cylindrical lens. The detection means may be provided with a reflecting system which spatially inverts a linear laser beam with respect to the collimation direction or the emission direction of the guide beam.

A guide beam direction setting apparatus according to a third aspect of the present invention comprises: a main body; a guide beam generator provided in the main body and having a guide-beam emission optical system for emitting a guide beam of light; an indicator-beam emission optical system, provided in the main body, for emitting a linear indicator beam which is seen as linearly extending in an emission direction of the guide beam when viewed from the side where a collimation direction means is disposed; a pair of retroflection plates disposed with respect to a collimation direction of the collimation direction means and spaced from the main body, the retroreflection plates being adapted for reflecting the linear indicator beam toward the indicator-beam emission optical system; detection means, provided in the main body, for detecting the linear indicator beam reflected toward the indicator-beam emission optical system by the pair of retroflection plates; and rotation control means, provided in the main body, for rotating and controlling the indicator-beam emission optical system so that the emission direction of the guide beam is aligned with the collimation direction, based on a detected output of the detection means.

A guide beam direction setting apparatus according to a fourth aspect of the present invention comprises: a main body; a guide beam generator provided in the main body and having a guide-beam emission optical system for emitting a guide beam of light; an indicator-beam emission optical system, provided in the main body, for emitting a linear indicator beam which is seen as linearly extending in an emission-direction of the guide beam when viewed from the side where collimation direction means is disposed; two pairs of retroflection plates disposed with respect to the collimation direction means and spaced from the main body, the retroflection plates being provided at symmetrical positions with respect to an optical axis of the indicator-beam emission optical system and being adapted for reflecting the linear indicator beam toward the indicator-beam emission optical system; detection means, provided in the main body, for detecting the linear indicator beam reflected toward the indicator-beam emission optical system by the two pairs of retroflection plates; and rotation control means, provided in the main body, for rotating and controlling the indicator-beam emission optical system so that the emission direction of the guide beam is aligned with the collimation direction, based on a detected output of the detection means.

Preferably, the linear indicator beam is circularly polarized light; one of the two pairs of retroreflection plates is provided with a quarter-wave plate; the detection means is provided with the polarizing beam splitter by which the linear indicator beam reflected by the pair of retroreflection plates having the quarter-wave plate and the linear indicator beam reflected by the pair of retroreflection plates having no quarter-wave plate are separated from each other; the detection means is provided with a pair of light receiving elements for receiving both one pair of linear indicator beams transmitted through the polarizing beam splitter and another pair of linear indicator beams transmitted through the polarizing beam splitter; and the rotation control means rotates and controls the indicator-beam emission optical system, based on detected outputs of the pair of light receiving elements.

A guide beam direction setting apparatus according to a fifth aspect of the present invention comprises: a main body; a guide beam generator provided in the main body and having a guide-beam emission optical system for emitting a guide beam of light; an indicator-beam emission optical system, provided in the main body, for emitting a linear indicator beam which is seen as linearly extending in an emission direction of the guide beam when viewed from the side where collimation direction means is disposed; retroreflection plates spaced from the main body, the retroreflection plates being adapted for reflecting the linear indicator beam toward the indicator-beam emission optical system and being provided with quarter-wave plates on one side with respect to a collimation direction of the collimation direction means; detection means, provided in the main body, for detecting both the linear indicator beam reflected by the retroreflection plates having the quarter-wave plates and the linear indicator beam reflected by the pair of retroreflection plates having no quarter-wave plates; and rotation control means, provided in the main body, for rotating and controlling the indicator-beam emission optical system so that the emission direction of the guide beam is aligned with the collimation direction, based on a difference between both detected outputs of the detection means.

Preferably, the rotation control means can be remotely controlled.

A guide beam direction setting apparatus according to a sixth aspect of the present invention comprises: a guide beam generator having a guide-beam emission optical system for emitting a guide beam and an indicator-beam emission optical system for emitting a fan-shaped indicator beam which is seen as linearly extending in an emission direction of the guide beam from the side where a collimation direction means is disposed; and detection means provided in the collimation direction means. The detection means has first and second photosensors, spaced in a collimation direction, for receiving the indicator beam, and a directional relationship between the guide beam and the collimation direction is obtained from a positional relationship between the indicator beam on the first photosensor and the indicator beam on the second photosensor.

A guide beam direction setting apparatus according to a seventh aspect of the present invention comprises: a guide beam generator having a guide-beam emission optical system for emitting a guide beam; collimation direction setting means having an indicator-beam emission optical system for emitting a fan-shaped indicator beam which is seen as extending in a collimation direction from the side where the guide beam generator is disposed; and detection means provided in the guide beam generator. The detection means has first and second photosensors, spaced in an emission direction of the guide beam, for receiving the indicator beam, and a directional relationship between the guide beam and the collimation direction is obtained from a positional relationship between the indicator beam on the first photosensor and the indicator beam on the second photosensor.

A light-received signal from the first photosensor and a light-received signal from the second photosensor may be correlatively processed between corresponding channels, and when a correlation state is maximum, it may be judged that the guide beam and the collimation direction have been aligned.

In this case, in more detail, the guide beam direction setting apparatus further comprises: means for modulating the indicator beam; a wave detecting section for detecting a modulated light-received signal from the first photosensor and a modulated light-received signal from the second photosensor; an A/D conversion section for converting an analog signal output from the wave detecting section to a digital value; and an arithmetic processing section for processing data output from the A/D conversion section. In the guide beam direction setting apparatus, data from the first photosensor and data from the second photosensor are correlatively processed between corresponding channels, and when a correlation state is maximum, it is judged that the guide beam and the collimation direction have been aligned.

An alternative may be adopted in which a light-received signal from the first photosensor and a light-received signal from the second photosensor is correlatively processed in correspondence with channels to obtain a first correlation state, and thereafter a correlation processing is performed while a predetermined channel is shifted, in order to obtain a second correlation state, and when the first and second correlation states are nearly identical, it is judged that the guide beam and the collimation direction have been aligned.

In this case, in more detail, the guide beam direction setting apparatus further comprises: means for modulating the indicator beam; a wave detecting section for detecting a modulated light-received signal from the first photosensor and a modulated light-received signal from the second photosensor; an A/D conversion section for converting an analog signal output from the wave detecting section to a digital value; and an arithmetic processing section for processing data output from the A/D conversion section. In the guide beam direction setting apparatus, data from the first photosensor and data from the second photosensor are correlatively processed in correspondence with channels to obtain a first correlation state, and thereafter a correlation processing is performed while a predetermined channel is shifted, in order to obtain a second correlation state, and when the first and second correlation states are nearly identical, it is judged that the guide beam and the collimation direction have been aligned.

Another alternative may be adopted in which there are obtained a plurality of correlation states where a light-received signal from the first photosensor and a light-received signal from the second photosensor are shifted by the amount of a predetermined channel, and by using a result obtained when the obtained plurality of correlation states are interpolated, it is judged that the guide beam and the collimation direction have been aligned.

In this case, in more detail, the guide beam direction setting apparatus further comprises: means for modulating the indicator beam; a wave detecting section for detecting a modulated light-received signal from the first photosensor and a modulated light-received signal from the second photosensor; an A/D conversion section for converting an analog signal output from the wave detecting section to a digital value; and an arithmetic processing section for processing data output from the A/D conversion section. In the guide beam direction setting apparatus, there are obtained a plurality of correlation states where data from the first photosensor and data from the second photosensor are shifted by the amount of a predetermined channel, and by using a result obtained when the obtained plurality of correlation states are interpolated, it is judged that the guide beam and the collimation direction have been aligned.

BRIEF DESCRIPTION OF THE DRAWINGS

The present invention will be described in further detail with reference to the accompanying drawings wherein:

FIG. 16(a) is a schematic view showing a guide beam direction setting apparatus according to a fourth embodiment of the present invention and the state where retroreflection plates have been disposed;

FIG. 16(b) is a schematic view showing the guide beam direction setting apparatus according to the fourth embodiment and the relationship between the optical indicator-beam emission system and the retroreflection plates;

FIG. 18(c) and FIG. 18(d) are diagrams used to explain the detected output of a light receiving element shown in FIG. 19;

FIG. 27 is a diagram showing a change in the correlation coefficient obtained by interpolating a plurality of correlation states;

FIG. 28 is a perspective view showing an alternative of the cylindrical lens;

DETAILED DESCRIPTION OF THE PREFERRED EMBODIMENTS

Preferred embodiments of the present invention will hereinafter be described in detail in reference to the drawings.

First Embodiment

Figure 1:
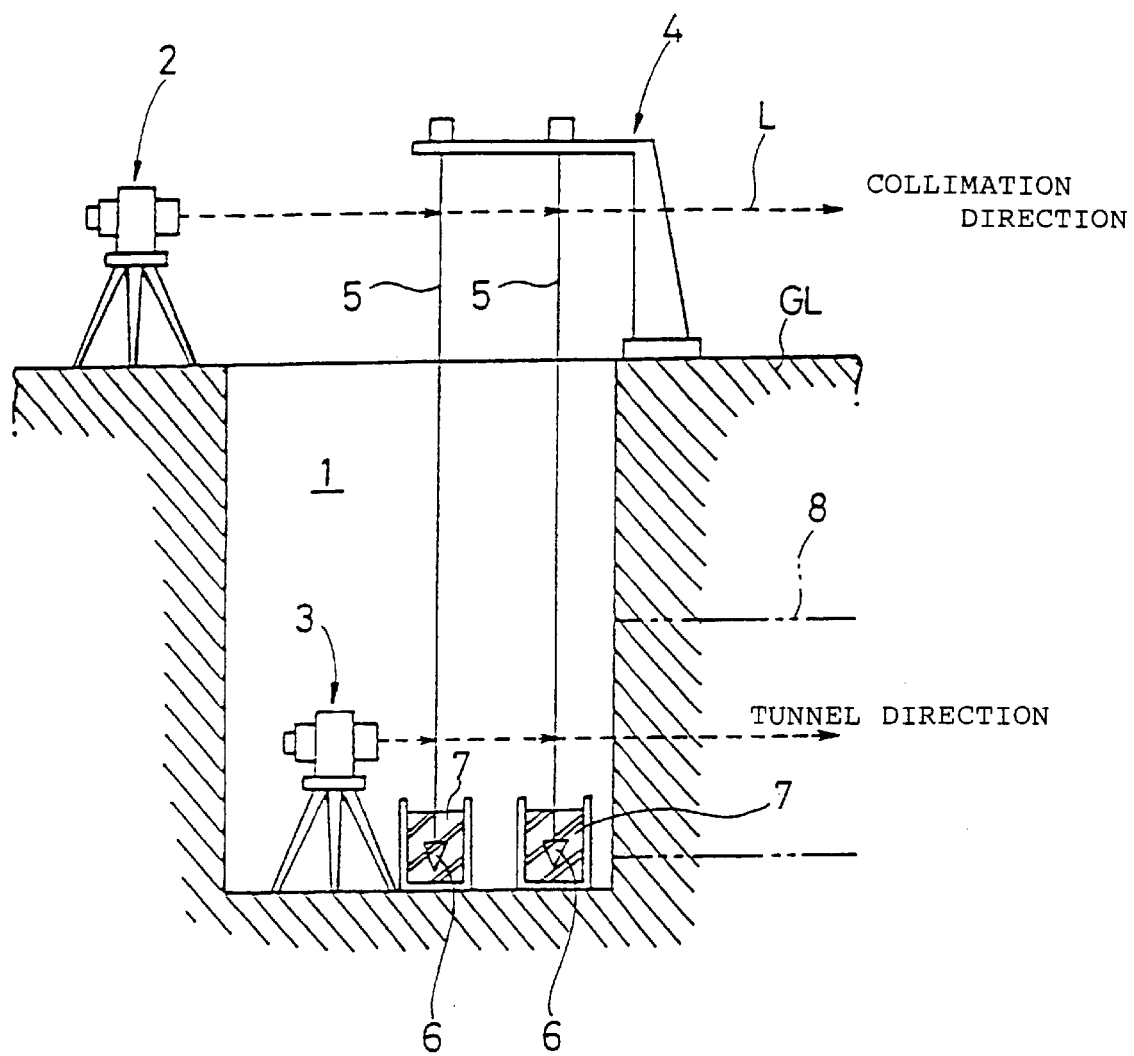
FIG. 1 is a diagram used to explain a conventional guide beam direction setting apparatus for setting a direction in which pipes are laid.
Figure 2:
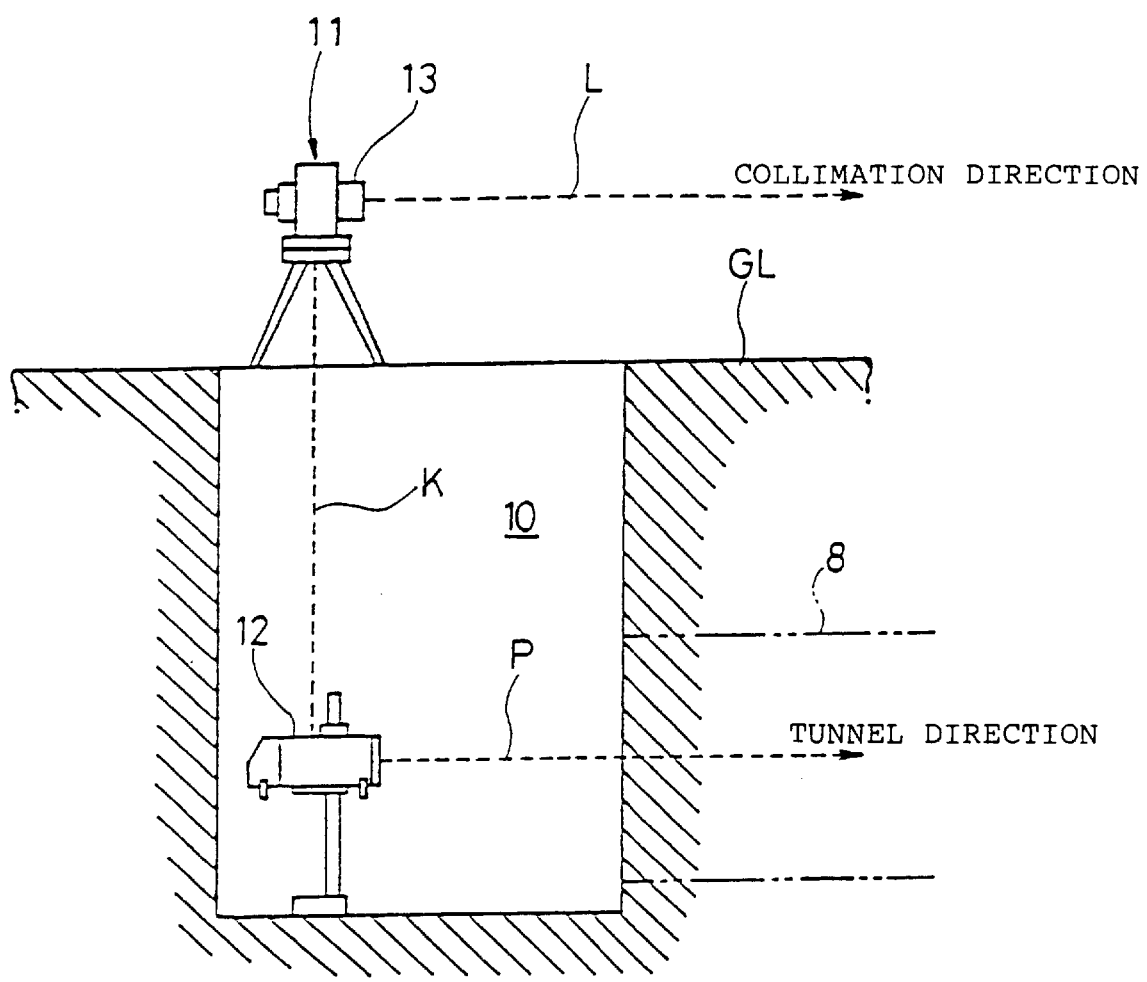
FIG. 2 is a schematic view showing a guide beam direction setting apparatus according to a first embodiment of the present invention, a pipe laser apparatus being installed in a vertical pit and a surveying machine being set above the pipe laser apparatus to perform a tunnel digging operation for laying pipes.
Figure 3:
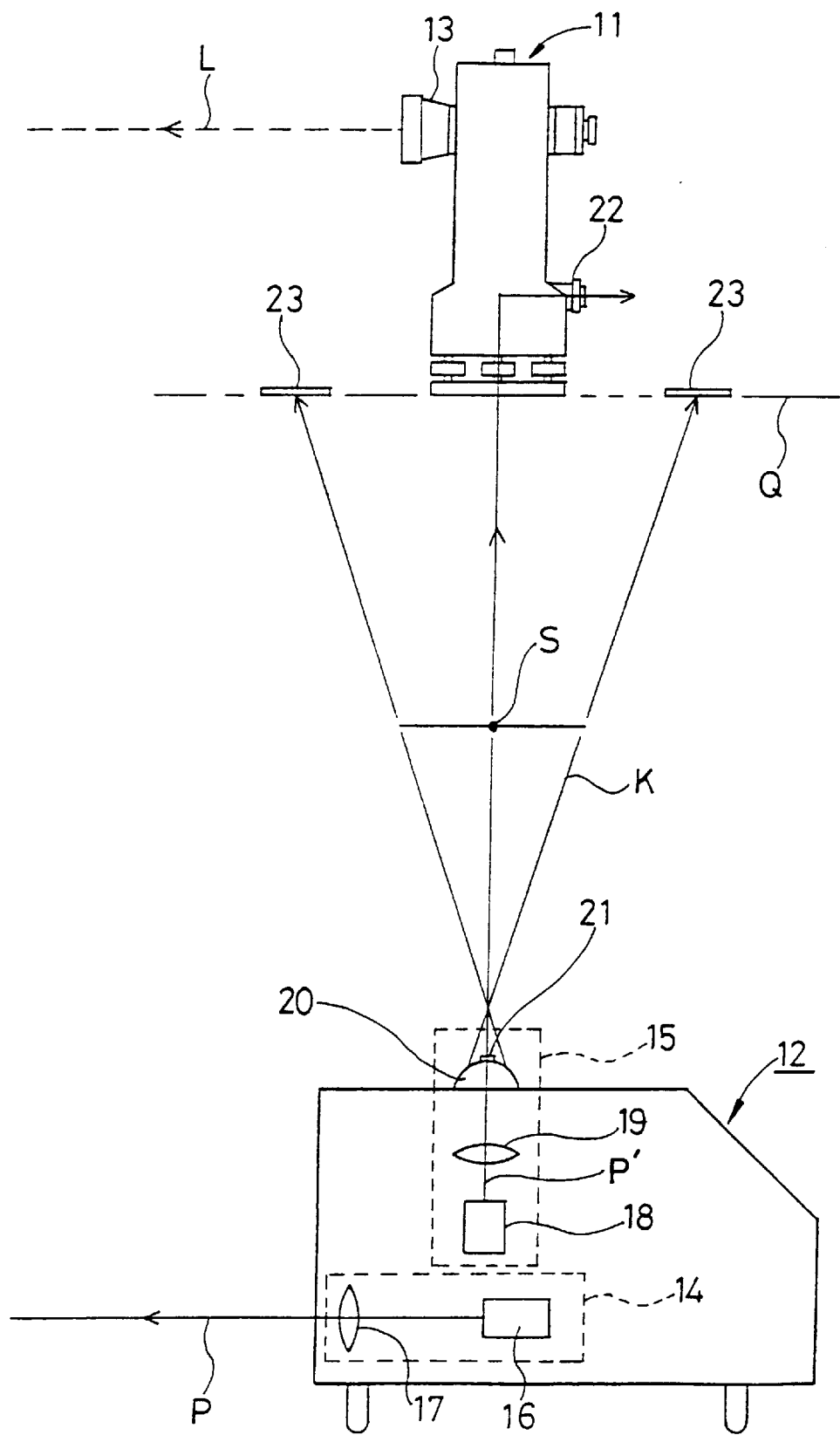
FIG. 3 is a schematic view showing the guide beam direction setting apparatus according to the present invention and the optical relationship between the guide beam generator and the surveying machine.

Referring to FIGS. 2 and 3, there is shown a guide beam direction setting apparatus constructed in accordance with a first embodiment of the present invention. In FIG. 2, reference numeral 10 is a vertical pit, 11 a surveying machine, such as a theodolite, installed on the ground surface GL, and 12 a guide beam generator. In this embodiment a pipe laser is used as the guide beam generator 12. The vertical pit 10 is covered, for example, with an iron plate (not shown). The surveying machine 11 is placed on the iron plate (not shown). The guide beam generator 12 is installed just under the surveying machine 11. The iron plate has, for example, a hole formed just under the surveying machine 11.

The surveying machine 11 is employed as collimation direction means of determining a direction of collimation L. In FIGS. 2 and 3, reference numeral 13 denotes a collimating telescope. The guide beam generator 12, as shown in FIG. 3, has an optical guide-beam emission system 14 for emitting a laser beam P as a guide beam and an optical indicator-beam emission system 15 for emitting an indicator beam K. The indicator beam K has a flat spatial spread in the direction of emission of the guide beam P. The optical guide-beam emission system 14 is roughly constituted by a laser beam source 16 and a collimator lens 17. The collimator lens 17 collimates the laser beam emitted from the laser beam source 16. The optical indicator-beam emission system 15 is roughly constituted by a laser beam source 18, a collimator lens 19, and a cylindrical lens 20.

The optical indicator-beam emission system 15 emits a laser beam P' in the vertical direction thereof. The emitted laser beam P' is collimated by the collimator lens 19 and then is guided to the cylindrical lens 20. The cylindrical lens 20 converts the collimated laser beam P' to an indicator beam K, which has a flat spatial spread in the emission direction of the guide beam P. Thus, the cylindrical lens 20 has a power of spatially enlarging the indicator beam K in the emission direction of the guide beam P. The indicator beam K used herein is taken to be a laser beam LO (see FIG. 4) which is seen as linearly extending in the emission direction of the guide beam P when viewed from the installation side of the surveying machine 11. The indicator beam K also spreads in the form of a fan on a vertical plane.

Figure 4:
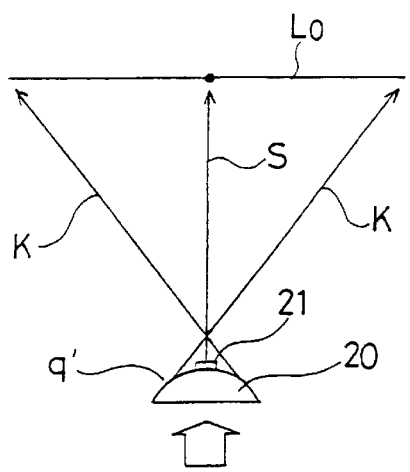
FIG. 4 is a partially enlarged view used to explain the operation of the cylindrical lens shown in FIG. 3.

A parallel plane portion 21, as shown on an enlarged scale in FIG. 4, is formed on the central top portion of the cylindrical lens 20. Part of the indicator beam K is transmitted through this parallel plane portion 21 and then is formed into a spot beam S. The spot beam S fulfills a role of prescribing an optical axis center (i.e., the center of a sphere). The spot beam S is recognized by a spherical center telescope 22 of the surveying machine 11. Note that the spherical center telescope 22 has the center of rotation of the surveying machine 11 as its optical axis. Therefore, the center of rotation of the surveying machine 11 is aligned with the optical axis of the optical indicator-beam emission system 15. The surveying machine 11 is provided integrally with a pair of spaced diffusing plates 23.

Figure 5:
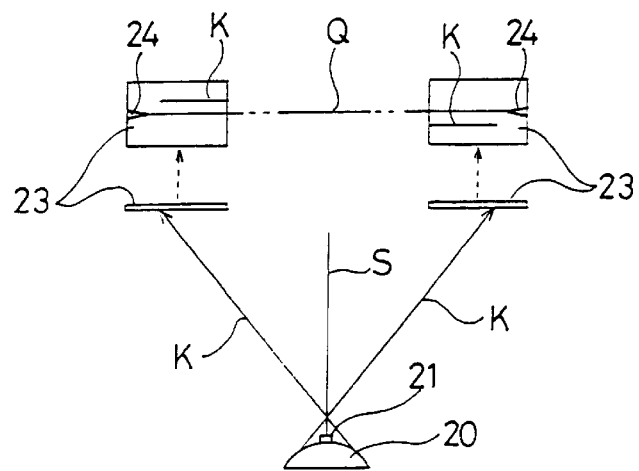
FIG. 5 is a diagram showing the positional relationship between an optical indicator-beam emission system and detection means and also showing how the emission direction of a guide beam and a collimation direction are aligned.

The pair of diffusing plates 23, as shown in FIG. 5, are provided with triangular reference scales 24, respectively. By connecting the vertexes of this pair of reference scales 24, line Q is defined. The direction of this line Q is parallel with the collimation direction L. The pair of diffusion plates 23 fulfill a role as detection means, which detects the indicator beam K (linear laser beam LO) and prescribes the direction of emission of the guide beam P. Note that if the diffusing plate 23 is provide din front of the spherical center telescope 22 so that the spot beams can be indirectly collimated, recognition of the spot beam S will become even easier.

Figure 6:
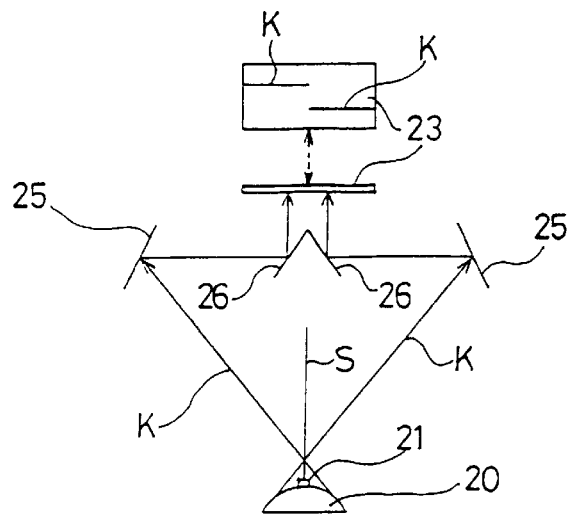
FIG. 6 is a diagram showing an alternative of the optical indicator-beam emission system shown in FIG. 5.
Figure 7:
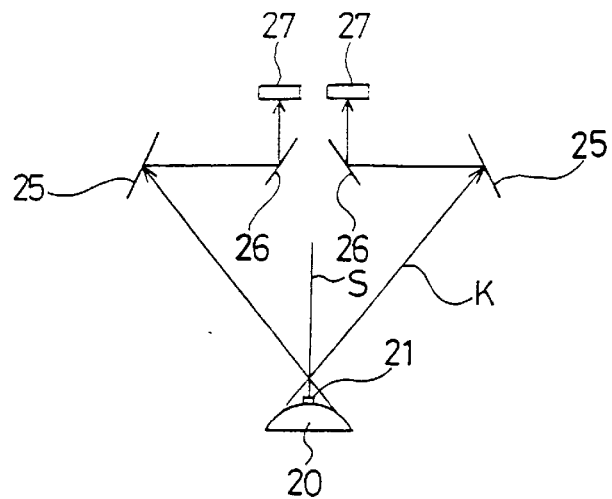
FIG. 7 is a diagram showing an alternative of the detection means shown in FIG. 6.

The indicator beam K (linear laser beam LO) is projected on the diffusing plates 23. An operator rotates the guide beam generator 12 so that the indicator beam K (linear laser beam LO) is aligned with the reference scales 24, while viewing the indicator beam K (linear laser beam LO) projected on the diffusing plates 23. This operation can align the emission direction of the guide beam P and the collimation direction L with each other. If the spacing between the pair of diffusing plates 23 is enlarged, the base length will then be correspondingly enlarged. With this operation, alignment accuracy between the emission direction of the guide beam P and collimation direction L can be enhanced. However, if the spacing between the pair of diffusing plates 23 is enlarged, the spacing between detection means will be correspondingly enlarged. Hence, as shown in FIG. 6, reflecting mirrors 25 and 26 are provided so that the indicator beam K is focused just under the surveying machine 11. If the detection means are constructed in this way, the alignment accuracy between the emission direction of the guide beam P and the collimation direction L can be enhanced without increasing the size of the detection means. In this embodiment, the operator directly views the diffusing plates 23 to align the emission direction of the guide beam P and the collimation direction L with each other. However, as shown in FIG. 7, the positions at which the indicator beam K is received may be detected by employing a pair of light receiving elements 27, such as line sensors, area sensors, and CCDs, instead of employing the diffusing plates 23. In the case the beam received positions are displayed on a screen, based on the outputs of the light receiving elements 27. Then, the offset from the reference scale 24 on the screen is corrected while viewing the screen, and the emission direction of the guide beam P and the collimation direction L are aligned with each other. Also, based on the outputs of the light receiving elements 27, the guide beam generator 12 may be remotely controlled so that the emission direction of the guide beam P and the collimation direction L are automatically aligned with each other.

Figures 8A, 8B:
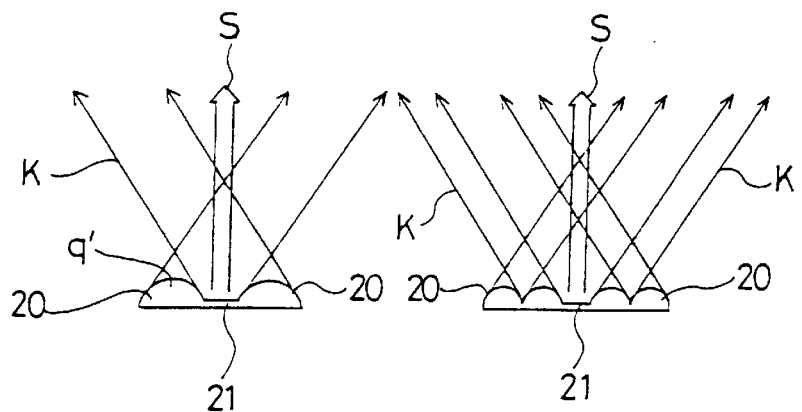
FIG. 8(a) is a diagram showing an alternative of the cylindrical lens shown in FIG. 4, two cylindrical lenses being spaced in the emission direction of the guide beam and a parallel plane portion being formed between the two cylindrical lenses.
FIG. 8(b) is a diagram showing another alternative of the cylindrical lens shown in FIG. 4, two pairs of cylindrical lenses being spaced in the emission direction of the guide beam and a parallel plane portion being formed between the two pairs of cylindrical lenses.

The cylindrical lens 20, in addition to the shape shown in FIG. 4, may be formed into shapes shown in FIGS. 8(*a*) and 8(*b*). FIG. 8(*a*) illustrates an example where two cylindrical lenses 20 are spaced in the emission direction of the guide beam P, and FIG. 8(*b*) illustrates an example where two pairs of cylindrical lenses 20 are spaced in the emission direction of the guide beam P. In either case a parallel plane portion 21 is formed in the central portion between the cylindrical lenses 20 for forming the spot beams. When the cylindrical lens 20 with the space shown in FIG. 4 is employed, the indicator beam K on the right side will be blocked if the left half portion of the cylindrical lens 20 (indicated by reference character q') has a stain on it. For this reason, the symmetry of the indicator beam K with respect to the spot beam S is degraded. If the symmetry of the indicator beam K with respect to the spot beam S is degraded, superimposition between the collimation direction L and the guide beam P will become difficult. However, if the cylindrical lenses 20 with the shapes shown in FIGS. 8(*a*) and 8(*b*) are employed, the symmetry of the indicator beam K with respect to the spot beams is maintained by one cylindrical lens 20 even when another cylindrical lens 20 has a stain at a position of q'. Therefore, superimposition between the collimation direction L and the guide beam P can be performed without difficulty.

Figure 9:
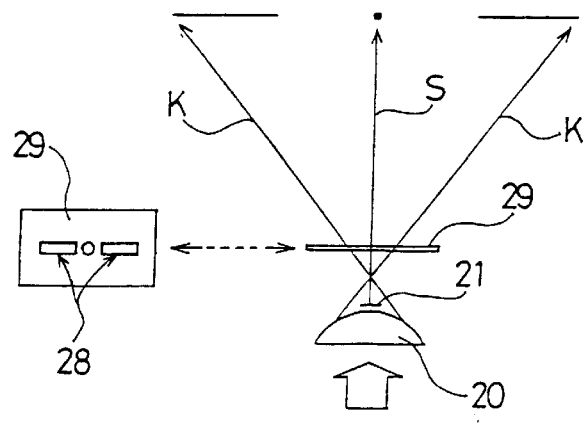
FIG. 9 is a diagram showing an alternative of the optical indicator-beam emission system shown in FIG. 4.

In addition, as shown in FIG. 9, a mask 29 with a slit 28 may be provided before or after the cylindrical lens 20 in order to define the spot beam S of the indicator beam K and the spread portion of the indicator beam K. In this way, the confirmation of the spot beams becomes even easier.

In this embodiment the cylindrical lens 20 has been employed for forming the linear indicator beam K which has a flat spatial spread in the emission direction of the guide beam P. However, an optical diffraction member may be employed instead of the cylindrical lens 20. Also, in the case where the laser source 18 comprises a semiconductor laser, the laser beam has a large spreading angle in the direction perpendicular to a parallel direction with the junction thereof, so the direction where the spreading angle is large is caused to correspond to the emission direction of the guide beam P. If done in this way, the constitution of the optical indicator-beam emission system 15 can be simplified in comparison with a laser having a circular laser beam, such as a He—Ne laser. In addition, in the case where a three-point light emitting type (multi-point light emitting type) is employed as a semiconductor laser, the array direction of the light emitting points is caused to correspond to the emission direction of the guide beam P. Thus, the indicator beam K with a spatial spread in the emission direction of the guide beam P can be easily formed.

Figure 10:
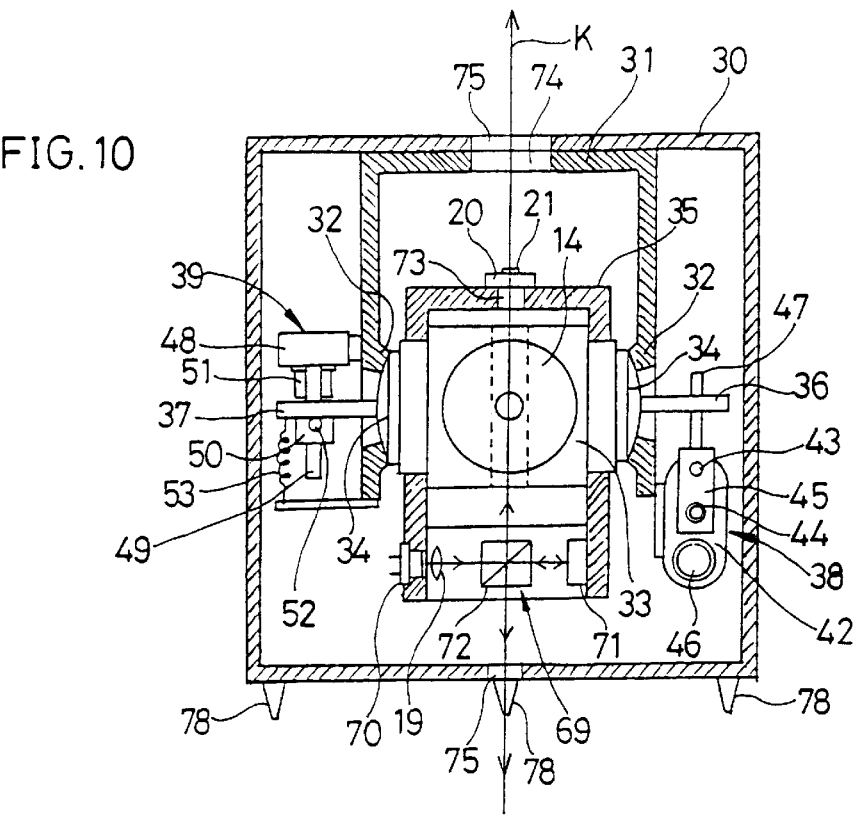
FIG. 10 is a front sectional view showing the detailed construction of the guide beam generator according to the present invention.
Figure 11:
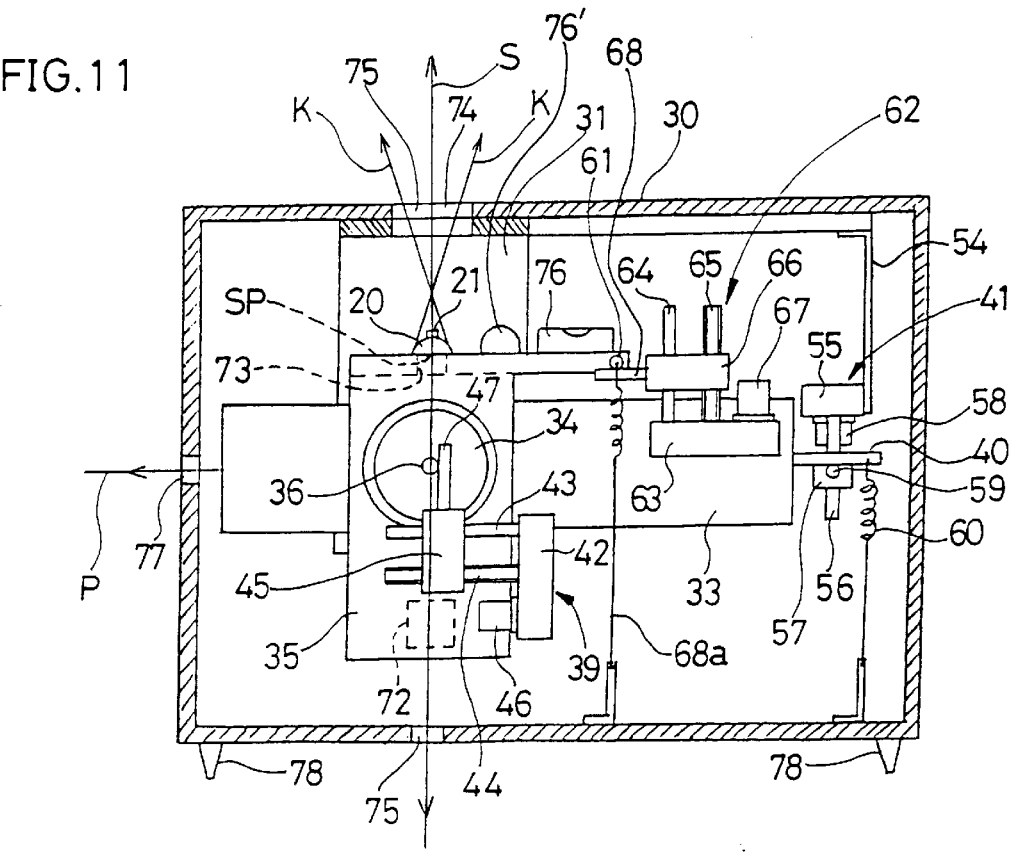
FIG. 11 is a side sectional view showing the detailed construction of the guide beam generator according to the present invention.

FIGS. 10 and 11 show the detailed construction of a pipe laser apparatus that is used as the guide beam generator 12 to which the present invention is applied. In these figure, reference numeral 30 denotes a box-shaped outer frame structure. The outer frame structure 30 has a U-shaped hanging frame 31 (also called the main body of the optical system) fixed thereto. The U-shaped hanging frame 31 has a pair of opposed spherical seats 32 formed in the inner opposite sides thereof, and the seats 32 have horizontal axis centers, respectively. Spherical-axis portions 34 are formed on the opposite surfaces of a rectangular body 33 which forms part of the optical guide-beam emission system 14, and they are fitted in the spherical seats 32. Thus, the rectangular body 33 is rotatable in three-axis directions. The spherical-axis portion 34 has at its front a spherical shape which engages the spherical seat 32. The proximal portion of the spherical-axis portion 34 is cylindrical in shape. An oscillating frame structure 35 is mounted on the cylindrical portion of the spherical-axis portion 34 of the rectangular body 33 so that it is freely rotatable. The spherical-axis portions 34 are provided with horizontal pins 36 and 37 protruding in the opposite directions, respectively. The outer frame structure 30 is provided with a horizontal rotation drive unit 38 on the side of the pin 36 and twisting unit 39 on the side of the pin 37. From the rear end face of the rectangular body 30 a pin 40 is protruded. The outer frame structure 30 is provided with an elevating unit 41 which elevates the rectangular body 33 through this pin 40.

The horizontal rotation drive unit 38 has a gear box 42, a guide shaft 43, a screw shaft 44, a slider 45, and a motor 46 for horizontal adjustment. The gear box 42 is fixed to the U-shaped hanging frame 31. The guide shaft 43 horizontally protrudes from the gear box 42. The screw shaft 44 extends in parallel with the guide shaft 43. The slider 45 meshes with the screw shaft 44 and also is inserted on the guide shaft 43 so that it is freely slidable. The motor 46 rotates the screw shaft 44 through the bear box 42. An engagement pin 47 is stood up in the slider 45 and engages the pin 36 of the rectangular body 33 so that it is freely slidable. The pin 36 of the rectangular body 33 is urged by a spring (not shown) so that it always abuts the engagement pin 47.

If the motor 46 is driven to rotate, the screw shaft 44 will then be rotated. The rotation of the screw shaft 44 causes the slider 45 to move horizontally. The horizontal displacement of this slider 45 is transmitted to the pin 36 of the rectangular body 33 through the engagement pin 47, so that rectangular body 33 (optical guide-beam emission system 14) is horizontally rotated integrally with the oscillating frame structure 35.

The twisting drive unit 39 has a gear box 48, a guide shaft 49, a screw shaft (not shown), a slider 50, and a twisting motor 51. The gear box 48 is fixed to the U-shaped hanging frame 31 on the opposite side of the aforementioned horizontal rotation drive unit 38. The guide shaft 49 extends vertically downward from the under surface of the gear box 48. The aforementioned screw shaft (not shown) extends in parallel with the guide shaft 49. The screw shaft meshes with the slider 50, and the guide shaft 49 is fitted into the slider 50 so that the slider 50 can freely slide. The motor 51 drives the screw shaft to rotate.

An engagement pin 52 is stood up in the slider 50 and engages the pin 37 of the rectangular body 33 so that it is freely slidable. The pin 37 of the rectangular body 33 is urged downward by a spring 53 so that is always abuts the engagement pin 52. If the motor 51 is driven to rotate, the screw shaft will then be rotated. The rotation of the screw shaft causes the slider 50 to move vertically. The vertical displacement of this slider 50 is transmitted to the pin 37 of the rectangular body 33 through the engagement pin 52, so the rectangular body 33 (optical guide-beam emission system 14) is twisted and rotated integrally with the oscillating frame structure 35.

The elevation drive unit 41 has a gear box 55, a guide shaft 56, a screw shaft (not shown), a slider 57, and a motor 58 for elevation. The gear box 55 is fixed to the outer frame structure 30 through a bracket 54. The guide shaft 56 vertically protrudes from the gear box 55. The screw shaft (not shown) extends in parallel with the guide shaft 56. The screw shaft (not shown) meshes with the slider 57, and the guide shaft 56 is fitted into the slider 57 so that the slider 57 can freely slide. The motor 58 drives the screw shaft to rotate. An engagement pin 59 is stood up in the slider 57 and engages the pin 40 of the rectangular body 33 so that it is freely slidable. The pin 40 of the rectangular body 33 is urged downward by a spring 60 so that it always abuts the engagement pin 59.

If the motor 58 is driven to rotate, the screw shaft will then be rotated. The rotation of the screw shaft causes the slider 57 to move vertically. The vertical displacement of this slider 57 is transmitted to the pin 40 of the rectangular body 33 through the engagement pin 59, so the rectangular body 33 (optical guide-beam emission system 14) is elevated integrally with the oscillating frame structure 35.

An angle setting unit 62 is provided on the side surface of the rectangular body 33. A pin 61 is provided near the rear end of the oscillating frame structure 35 and extends in parallel with the pin 36. The angle setting unit 62 relatively rotates the rectangular body 33 (optical guide-beam emission system 14) with respect to the oscillating frame structure 35 through the pin 61 and sets the horizontal angle of the optical guide-beam emission system 14.

That is, the angle setting unit 62 has a gear box 63, a guide shaft 64, a screw shaft 65, a slider 66, and a motor 67 for setting angle. The gear box 63 is fixed to the side surface of the rectangular body 33. The guide shaft 64 vertically protrudes from the gear box 63. The screw shaft 65 extends in parallel with the guide shaft 64. The screw shaft 65 meshes with the slider 66, and the guide shaft 64 is fitted into the slider 66 so that the slider 66 can freely slide. The motor 67 rotates the screw shaft 65 through the gear box 63. An engagement pin 68 is stood up in the slider 66 and engages the pin 61 of the oscillating frame structure 35 so that it is freely slidable. The pin 61 of the oscillating frame structure 35 is urged downward by a spring 68a so that it always abuts the engagement pin 68.

If the motor 67 is driven, the slider 66 will then be vertically moved. The vertical displacement of the slider 66 is transmitted to the pin 61 of the oscillating frame structure 35 through the engagement pin 68, so that oscillating frame structure 35 is elevated with respect to the rectangular body 33. This embodiment is freely movable in the three-axis directions by employing the spherical seats. However, a gimbal structure may be used excluding the twisting operation. Usually, the rotation in the twisting direction is manually performed when the guide beam generator 12 is installed.

The procedure of setting the inclination of the guide laser beam P by this pipe laser apparatus will be described. The apparatus is roughly installed in parallel and operated. Then, the angle setting unit 62 and the elevating unit 41 perform an adjustment operation so that an incline sensor 76, described later, and the guide beam P become horizontal. This causes the pipe laser apparatus to be set horizontally, that is, to a reference position. Based on this horizontal reference position, the oscillating frame structure 35 is inclined in a direction opposite to a set angle by the angle setting unit 62. Therefore, the angle setting unit 62 is caused to reach an inclined state. Next, if the rectangular body 33 is inclined integrally with the angle setting unit 62 by the elevating unit 41 so that the incline sensor 76 becomes horizontal, the guide beam P will be inclined at the set angle. However, this setting method, even in the case where the angle detection range of the incline sensor 76 is narrow, can directly incline an incline sensor if its angle of detection is wide.

The optical indicator-beam emission system 15 in this embodiment comprises a light source unit 69 and the cylindrical lens 20. The light source unit 69 is provided in the lower portion of the oscillating frame structure 35. The light source unit 69 is roughly constituted by a laser beam source 70, a reflecting mirror 71, a beam splitter 72, and a collimator lens 19. The laser beam source 70 is provided in one of the mutually opposed wall surfaces of the oscillating frame structure 35. The reflecting mirror 71 is provided on the other wall surface so as to be opposed to the laser beam source 70. The beam splitter 72 is provided between the laser beam source 70 and the reflecting mirror 71. The collimator lens 19 is disposed between the beam splitter 72 and the laser beam source 70.

The beam splitter 72 has a role of splitting the laser beam emitted from the laser beam source 70 into upper and lower beams in the vertical direction. When the beam is emitted only upward, a reflecting mirror may be employed instead of the beam splitter 72.

Note that holes 73, 74, and 75 are respectively formed in the upper and lower portions of the oscillating frame structure 35, the U-shaped hanging frame 31, and the outer frame structure 30 for allowing the laser beam P' (linear indicator beam K) emitted in the vertical direction to pass vertically. In addition, the incline sensor 76 for detecting the inclination of the emission direction of the guide beam P and an incline sensor 76' extending in the direction crossing the incline sensor 76 are provided on the upper surface of the oscillating frame structure 35. Furthermore, the front surface of the outer frame structure 30 is formed with a hole 77 through which the guide beam P passes. The lower portion of the outer frame structure 30 is provided with support legs 78. With this arrangement, the outer frame structure 30 can be roughly adjusted in the horizontal direction. However, when the guide beam generator 12 is mounted on a stand shown in FIG. 2, the support legs 78 are not always needed.

As previously described, this embodiment has been constructed so that the optical indicator-beam emission system 15 is provided in the guide beam generator 12 and that the diffusing plates 23 are provided in the surveying machine 11.

However, the present invention is not limited to the aforementioned embodiment.

For example, the diffusing plates 23 may be provided in the guide beam generator 12, and the optical indicator-beam emission system 15 may be provided in the surveying machine 11. In this case the indicator beam K has a flat spatial spread in the collimation direction L. In other words, the indicator beam K is seen as linearly extending in the collimation direction L when viewed from the side of the guide beam generator 12. In the case where the laser beam source 18 is constituted by a semiconductor laser, the direction where the spreading angle is large corresponds to the collimation direction L. In the case where the laser beam source is of a multi-port light emitting type, the array direction of light emitting points corresponds to the collimation direction L. The diffusing plates 23, on the other hand, are installed in correspondence with the emission direction of the guide beam P.

Furthermore, this embodiment has been described with reference to the digging operation of the tunnel 8. However, this is merely an example, so the present invention is not limited to this example.

For example, this guide beam direction setting apparatus can be employed for detecting the bending or torsion of a building construction or a large-sized metal cutting machine tool. That is, the guide base direction setting apparatus is also applicable to the detection and alignment of the pillars and walls of a building construction and the assembly, fabrication and installation of large-sized machines.

According to the aforementioned first embodiment, the emission direction of the guide beam P and the collimation direction L of a survey can be easily and quickly aligned with each other, and cumulative error can be reduced. Moreover, miniaturization is possible.

Second Embodiment

Figure 12A:
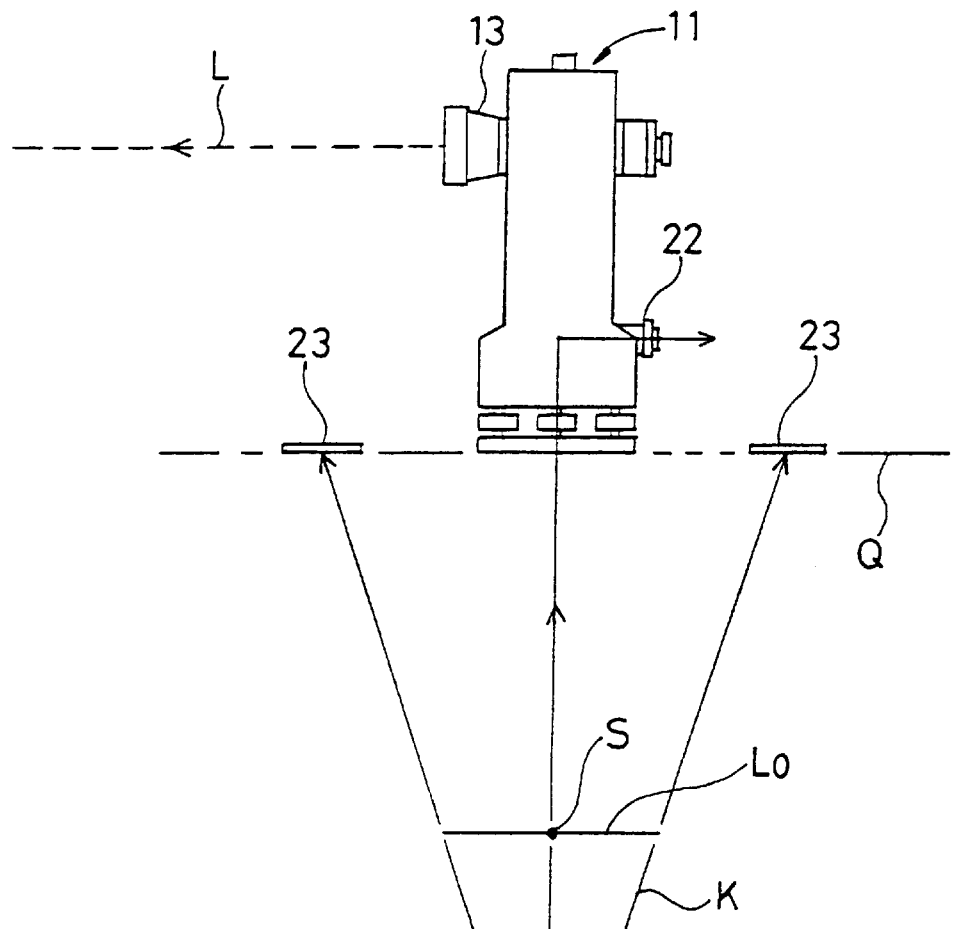
FIG. 12(a) is a schematic view showing a guide beam direction setting apparatus according to a second embodiment of the present invention and the optical relationship between the guide beam generator and the surveying machine.
Figures 12B, 12C:
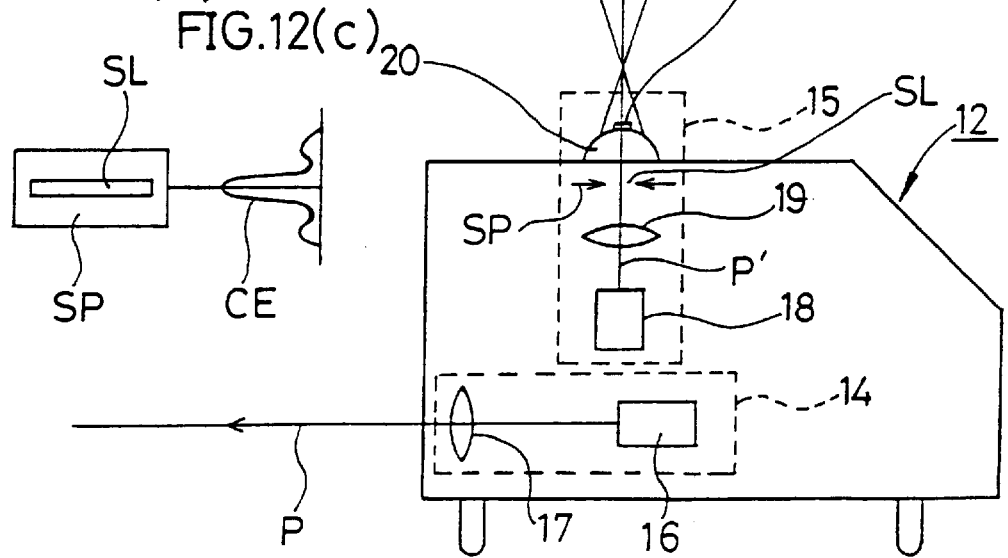
FIG. 12(b) is a plan view of the diaphragm plate shown in FIG. 12(a)
FIG. 12(c) illustrates the diffracted pattern of a laser beam diffracted by the slit shown in FIG. 12(b)
Figure 13:
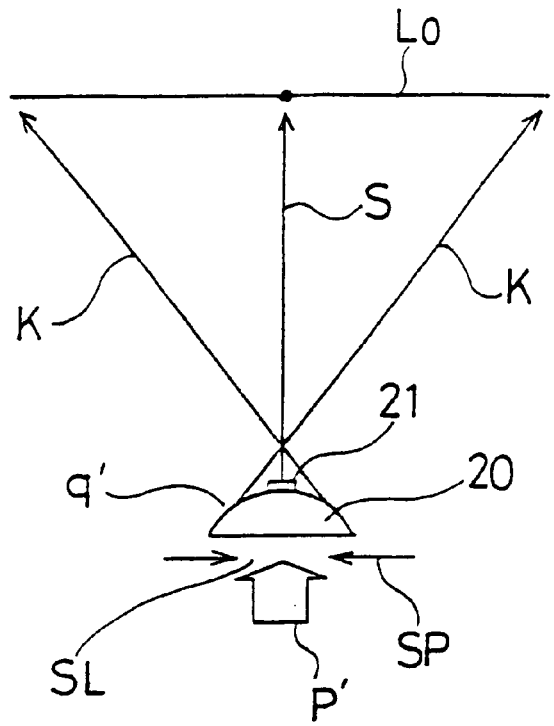
FIG. 13 is a partially enlarged view used to explain the operation of the cylindrical lens shown in FIG. 12.
Figure 14:
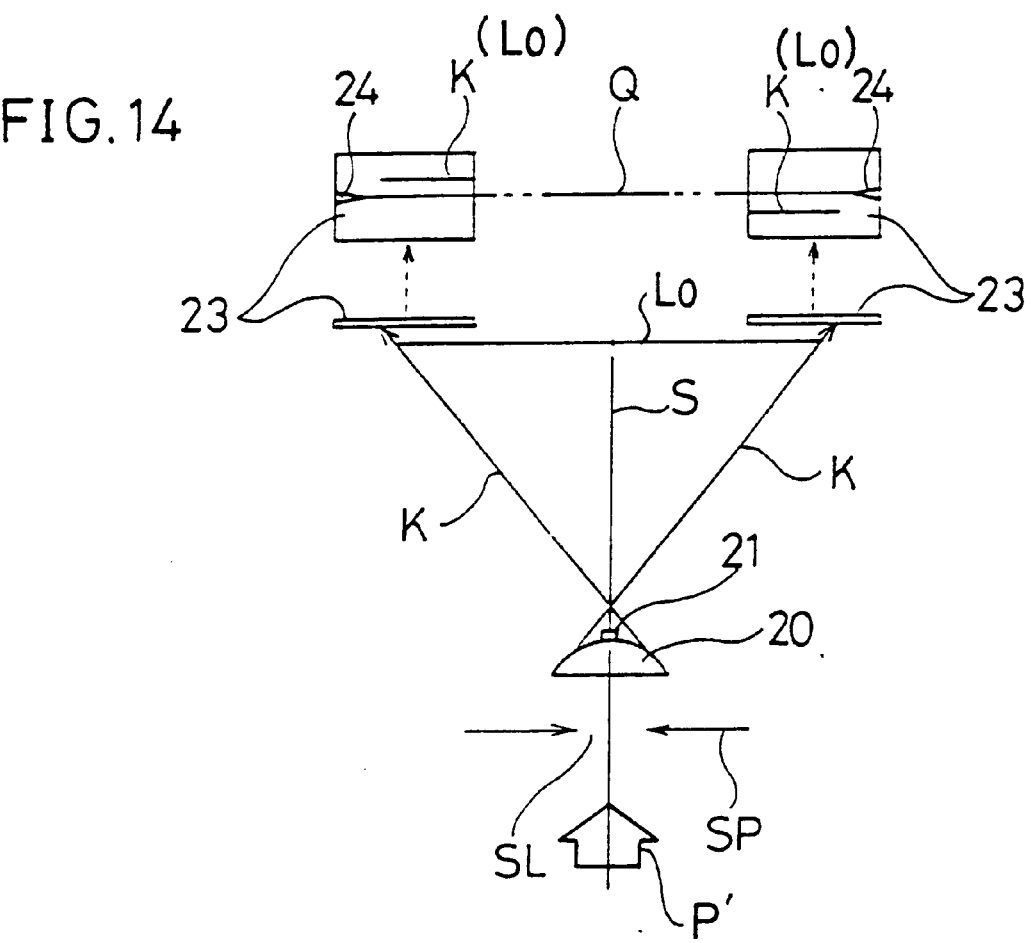
FIG. 14 is a schematic diagram showing the positional relationship between the optical indicator-beam emission system and the detection means and also showing how the emission direction of the guide beam and the collimation direction are aligned.

Referring to FIGS. 12 through 14, there is shown a guide beam direction setting apparatus constructed in accordance with a second embodiment of the present invention.

For an optical indicator-beam emission system 15, a diaphragm plate SP is provided between a collimator lens 19 and a cylindrical lens 20, as shown in FIG. 12(a). The diaphragm plate SP, as shown in FIG. 12(b), has a slit SL which extends in the direction where the linear indicator beam K extends. This slit SL fulfills a role of diffracting the laser beam P'. The diffracted pattern is shown in FIG. 12(c). The laser beam P is diffracted by the slit SL and then is guided to the cylindrical lens 20. The operation of the cylindrical lens 20 is the same as the first embodiment.

The laser beam P' becomes a clear linear laser beam L0 where the luminance brightness is high by the diffraction effect of the slit SL and which extends in the direction in which the slit SL extends, as shown in FIGS. 13 and 14. In FIG. 12(c), reference character CE denotes the intensity distribution of the peak portion of the laser beam P' whose luminance brightness is high. Note that the slit SL is not limited to a rectangular shape.

In this embodiment the cylindrical lens 20 is convex in shape. However, the cylindrical lens may be concave in shape. In the case where the cylindrical lens is convex in shape, the laser beam P' is converged and forms a focal point. However, in the case of a concave lens, the laser beam P' linearly enlarges without forming a focal point.

Also, this embodiment is constructed so that the diaphragm plate SP is provided between the collimator lens 19 and the cylindrical lens 20. However, the diaphragm plate SP may be provided in front of the cylindrical lens 20.

Note that in the case where the guide beam generator 12 is provided in a pipe laser apparatus, the diaphragm plate SP is provided on the back surface of the cylindrical lens 20. In FIG. 11 the diaphragm plate SP is shown by a broken line.

According to this embodiment, the line width of the linear indicator beam can be made narrow and clear by a diffraction phenomenon, and consequently, the accuracy of the alignment of the emission direction of the guide beam P with the collimation direction L can be enhanced.

Third Embodiment

Figure 15C:
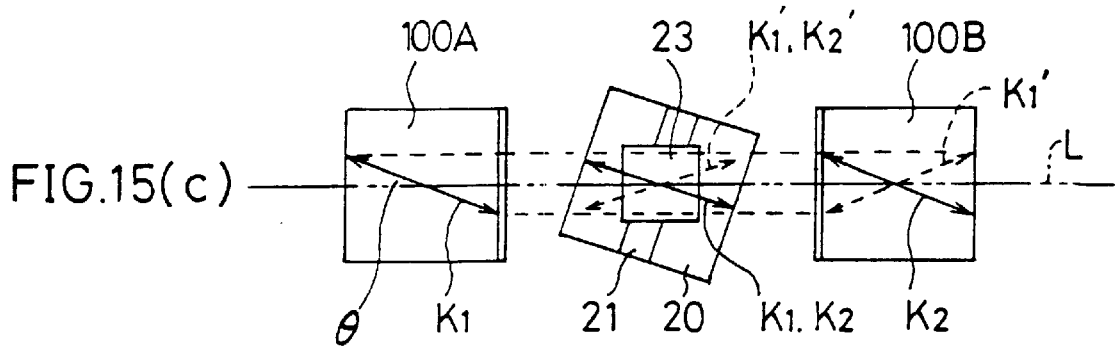
FIG. 15(c) is a schematic view showing the plane positional relationship of the reflecting system of FIG. 15(a) to the cylindrical lens and the case where the collimation direction L and the direction in which the linear indicator beam K extends have not been aligned.
Figure 15B:
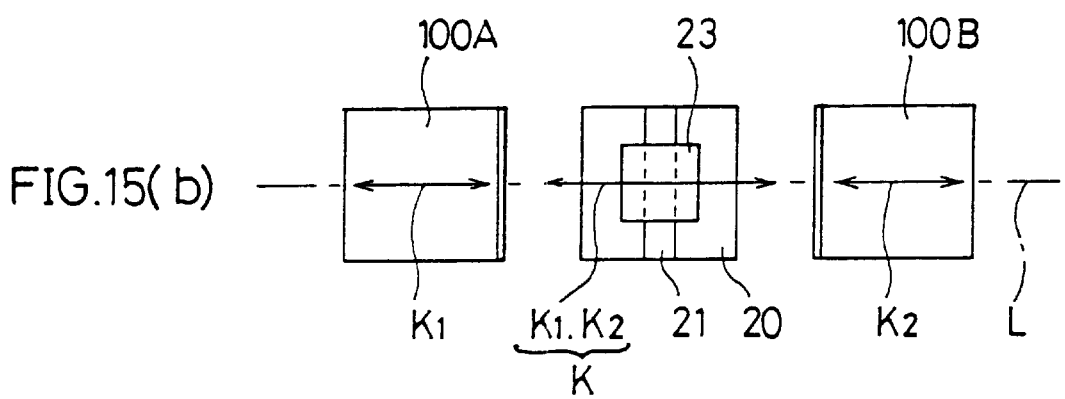
FIG. 15(b) is a schematic view showing the plane positional relationship of the reflecting system of FIG. 15 to the cylindrical lens and the case where the collimation direction L and the direction in which the linear indicator beam K extends have been aligned.
Figure 15A:
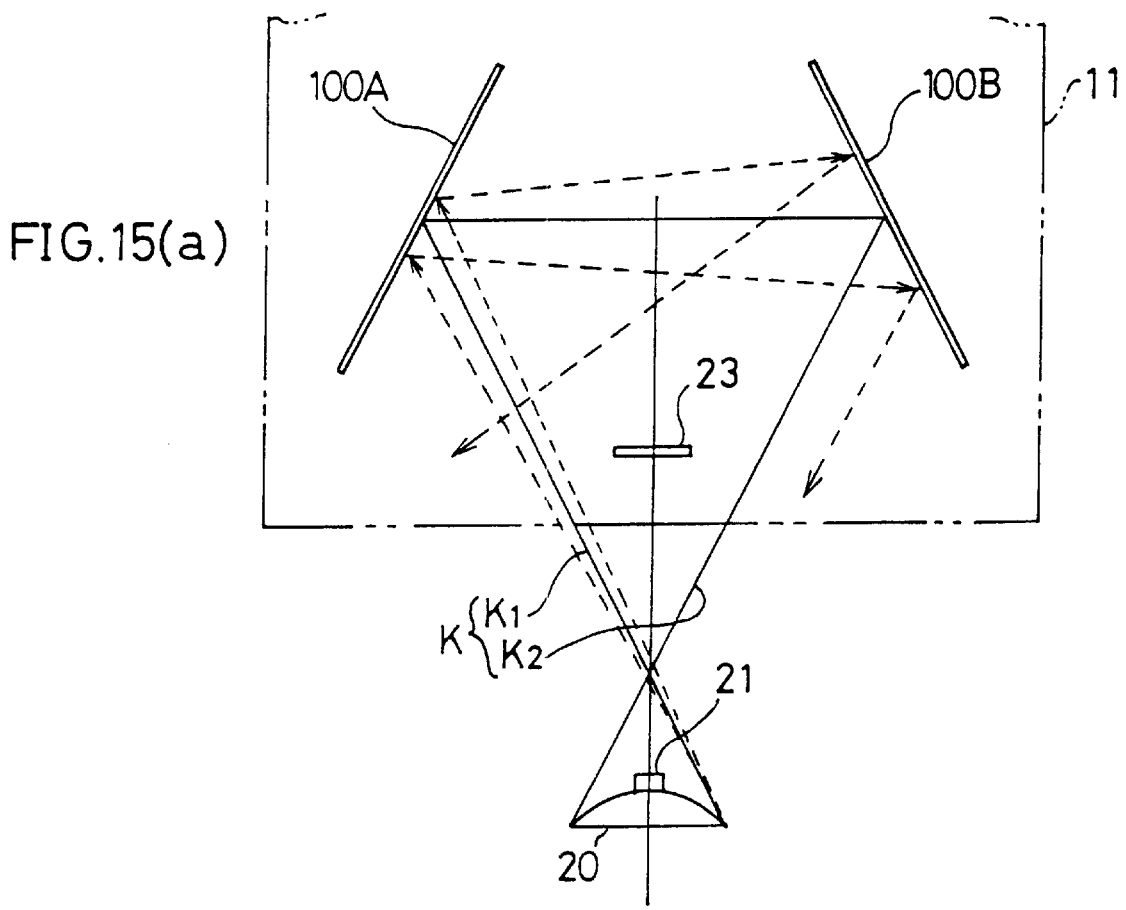
FIG. 15(a) is a schematic view showing a guide beam direction setting apparatus according to a third embodiment of the present invention and also showing now a linear indicator beam is reflected.

Referring to FIG. 15(a) through 15(c), there is shown a guide beam direction setting apparatus constructed in accordance with a third embodiment of the present invention.

FIG. 15(a) illustrates a construction where a pair of reflecting mirrors 100A and 100B are provided in detection means. These reflecting mirrors 100A and 100b reflect the linear indicator beam K two times, thereby constituting a reflecting system which spatially inverts the extending direction of the linear indicator beam K with respect to the collimation direction L. In the case where the collimation direction L and the extending direction of the linear indicator beam K are aligned with each other, the direction of the linear indicator beam K1, which is first reflected by the reflecting mirror 100A and then is reflected by the reflecting mirror 100B and which reaches the diffusing plate 23, and the direction of the linear indicator beam K2, which is first reflected by the reflecting mirror 100B and then is reflected by the reflecting mirror 100A and which reaches the diffusing plate 23, are aligned with each other, as shown in FIG. 15(b). However, as shown in FIG. 15(c), when the linear indicator beam K is shifted from the collimation direction L by an angle of θ, the linear indicator beam K1 is reflected by the reflecting mirror 100A and then is reflected by the reflecting mirror 100B. When this occurs, the extending direction of the linear indicator beam K1 is spatially inverted with respect to the collimation direction L. Reference character K1' denotes the spatially inverted linear indicator beam. The same may be said of the case where the linear indicator beam K2 is reflected by the reflecting mirror 100B and then is reflected by the reflecting mirror 100A. Therefore, the linear indicator beams K1' and K'2, spatially inverted with respect to the collimation direction by two reflections, reach the diffusing plate 23, together with the linear indicator beam K1 and K2. From the angle formed by the linear indicator beam K1 (K1') and the linear indicator beam K2 (K2'), the extending direction of the linear indicator beam K with respect to the collimation direction L can be recognized with double accuracy.

That is, according to this embodiment, the linearly extending direction of the linear indicator beam is spatially inverted with respect to the collimation direction L. Therefore, by confirming both the direction of the linear indicator beam before mirror-image inversion and the direction of the linear indicator beam after mirror-image inversion, the direction of the linear indicator beam to the collimation direction can be judged with double accuracy.

Fourth Embodiment

Figure 17:
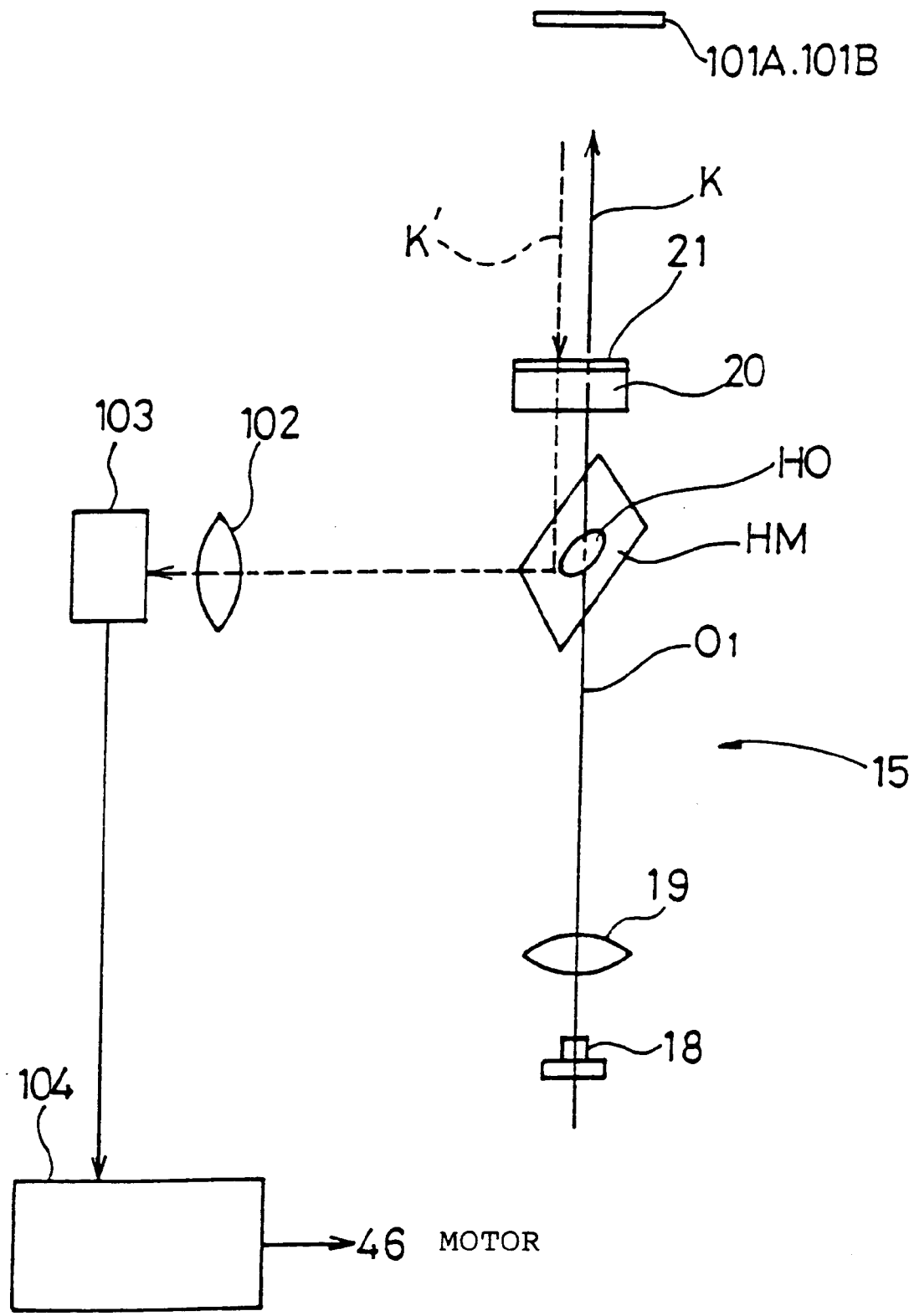
FIG. 17 is a schematic diagram showing the relationship between the optical indicator-beam emission system, the detection means, and the rotation control means shown in FIG. 16(b)
Figure 18A:
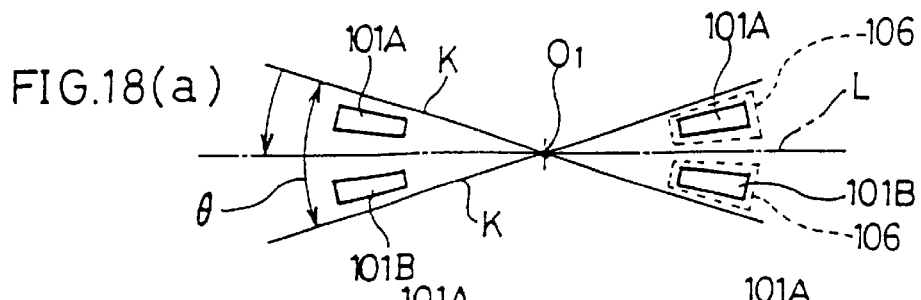
FIG. 18(a) is a schematic view showing a guide beam direction setting apparatus according to a fifth embodiment of the present invention and the state where retroreflection plates have been disposed.
Figure 18B:
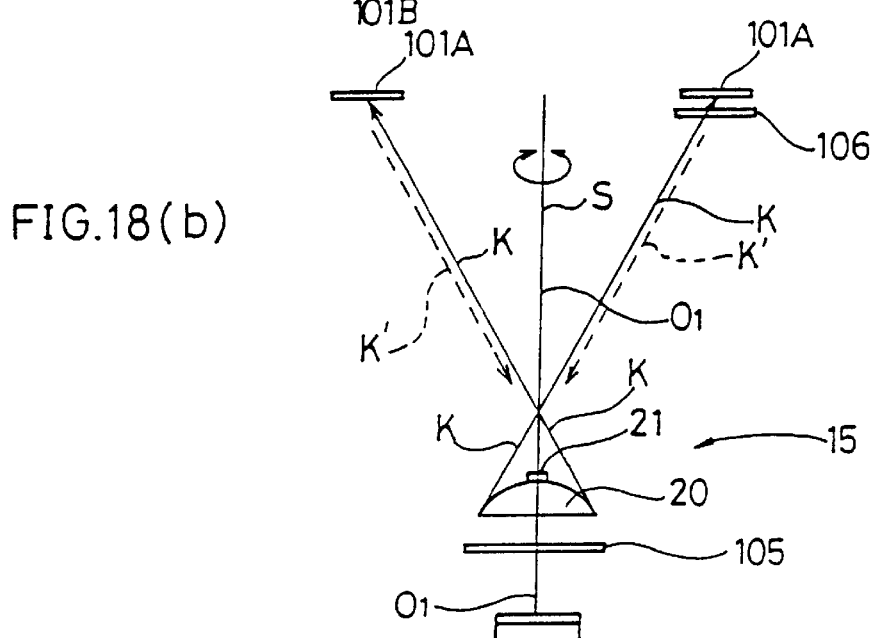
FIG. 18(b) is a schematic view showing the guide beam direction setting apparatus according to the fifth embodiment and the relationship between the optical indicator-beam emission system and the retroreflection plates.
Figure 18C:
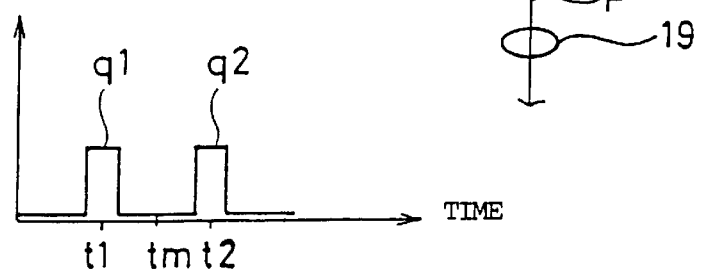
FIG. 18(c) is a diagram used to explain the detected output of a light receiving element shown in FIG. 17.
Figure 18D:
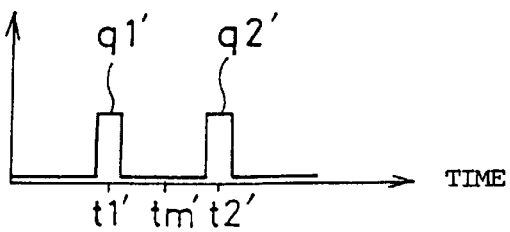

Referring to FIGS. 16 and 17, there is shown a guide beam direction setting apparatus constructed in accordance with a fourth embodiment of the present invention. As shown in FIG. 16(b), the surveying machine 11 is provided with a pair of retroreflection plates 101A and 101B which are symmetrical with respect to the collimation direction L. Two pairs of the retroreflection plates 101A and 101B are provided as symmetrical positions with respect to the optical axis 01 of an optical indicator-beam emission system 15. However, one pair of retroreflection plates 101A and 101B are masked, and in this embodiment, they are not used. The optical indicator-beam emission system 15 has a holed mirror HM between a collimate lens 19 and a cylindrical lens 20. Reference character HO denotes the holed portion of the mirror HM. A laser beam P' passes through the holed portion HO and is guided to the cylindrical lens 20. Therefore, the laser beam P' is assumed to be a linear indicator beam K and guided to the retroreflection plates 101A and 101B. The structure of the retroreflection plates 101A and 101B is known, for example, in Japan Laid-Open Patent Publication No. HEI 7-83656.

The linear indicator beam K is reflected by the retroreflection plates 101A and 101B and become a reflected beam K'. This reflected beam K' returns in the same direction as the incident direction upon the retroreflection plates 101A and 101B and then reaches the optical indicator-beam emission system 15. The reflected beam K' is reflected by the reflecting surface of the holed mirror HM and then goes to a collective lens 102. The reflected beam K' is collected to a light receiving element 103 by the collective lens 102. The output of the light receiving element 103 is input to rotation control means 104.

The rotation control means 104 has a role of rotating and controlling the motor 46 shown in FIG. 11. If the motor 46 is rotated in both directions at constant speed, the linear indicator beam K will be swung, for example, in a range of angle θ, as shown in FIG. 16(a). During the time the linear indicator beam K is swung at this angle θ, the beam K is reflected by the retroreflection plates 101A and 101B. The reflected beam K' is received by the light receiving element 103. The detected outputs q1 and q2 of the light receiving element 103 are shown in FIG. 16(c).

Times t1 and t2 are obtained by the reciprocal vibration of this linear beam K1. Time tm is obtained by averaging the times t1 and t2. In the case where the optical axis 01 of the optical indicator-beam emission system 15 is aligned with the collimation direction L, the linear indicator beam K can be automatically aligned with the collimation direction L if the time for driving the motor 46 is set based on the average time tm. That is, the guide beam P can be aligned with the collimation direction L. In the case of the motor 46 with an encoder, the guide beam P can be aligned with the collimation direction L by converting the pulse signal of the encoder to angle.

Fifth Embodiment

Figure 19:
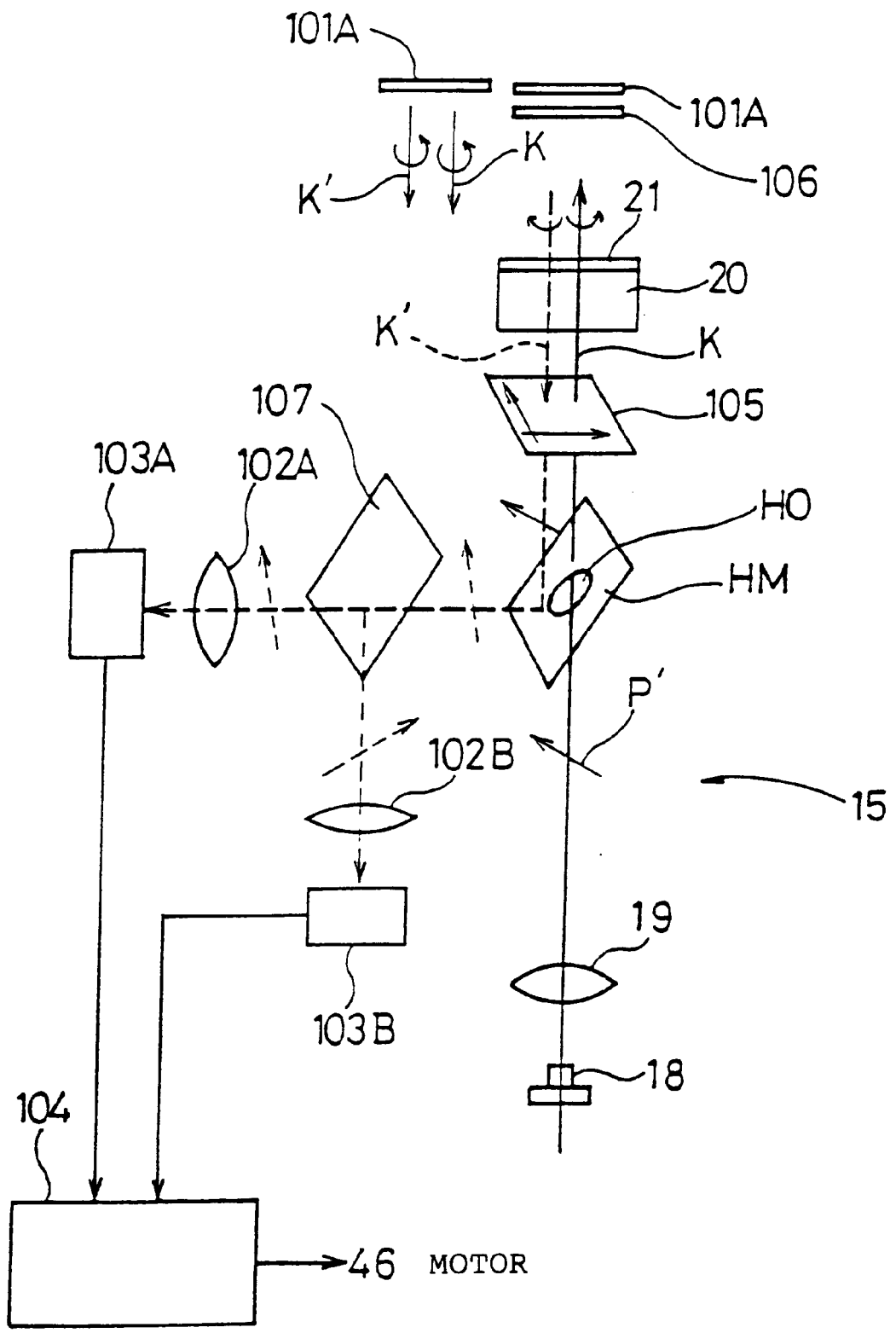
FIG. 19 is a schematic diagram showing the relationship between the optical indicator-beam emission system, the detection means, and the rotation control means shown in FIG. 18(b)

Referring to FIGS. 18 and 19, there is shown a guide beam direction setting apparatus constructed in accordance with a fifth embodiment of the present invention. In this embodiment two pairs of retroreflection plates 101A and 101B are used. For an optical indicator-beam emission system 15 of this embodiment, a quarter-wave plate 105 is provided between a cylindrical lens 20 and a holed mirror HM, and converts linearly polarized light to circularly polarized light or circularly polarized light to linearly polarized light. One of the two pairs of retroreflection plates 101A and 101B is provided with a quarter-wave plate 106 for converting the polarization direction of the circularly polarized laser beam P' in the opposite direction, as shown in FIGS. 18(a) and 18(b). The linearly polarized laser beam P' passes through the holed portion HO of the holed mirror HM and is guided to the quarter-wave plate 105. The laser beam P' is converted, for example, to circularly polarized light with clockwise rotation, or right-circularly polarized light by the quarter-wave plate 105. Then, the right-circularly polarized light is converted to a linear indicator beam K by the cylindrical lens 20. This linear indicator beam K is guided to the pair of retroreflection plates 101A and 101B having the quarter-wave plate 106 and to the pair of retroreflection plates 101A and 101B having no quarter-wave plate. For the linear indicator beam K reflected by the pair of retroreflection plates 101A and 101B having the quarter-wave plate 106, the direction of polarization is rotated counterclockwise (opposite direction) with respect to the light traveling direction when the linear indicator beam K passes through the quarter-wave plate. The direction of polarization of the linear indicator beam K, reflected by the pair of retroreflection plates 101A and 101B having no quarter-wave plate 106, remains the same (clockwise) with respect to the light traveling direction. The reflected beam of right-circularly polarized light and the reflected beam of left-circularly polarized light return back to the optical indicator-beam emission system 15.

The reflected beam of left-circularly polarized light and the reflected beam of right-circularly polarized light pass through the quarter-wave plate 105 and are converted to linearly polarized light. Thus, both reflected beams K' beam become linearly polarized light beams which cross each other. The reflected beams K' of linearly polarized light, which cross each other, return to the holed mirror HM. Then, both reflected beam of light , K', lead to a polarizing beam splitter 107 which constitutes part of the detection means. This polarizing beam splitter 107 splits the reflected beam K' of linearly polarized light which cross each other. One reflected beam K' passes through the polarizing beam splitter 107 and is guided to a collective lens 102A, while the other reflected beam K' is reflected toward a collective lens 102B by the polarizing beam splitter 107. Both reflected beam K', collected by the collective lenses 102A and 102B, are received by light receiving element 103A and 103B, respectively.

The detected outputs of the light receiving elements 103A and 103B are input to rotation control means 104. The detected outputs q1 and q2 of the light receiving element 103A and the detected outputs q1' and q2' of the light receiving element 103B are shown in FIG. 16(c). The times t1, t2, t1', and t2' are obtained by the reciprocal vibration of the linear beam K1. The time tm is obtained by averaging the times t1 and t2.

Figure 20:
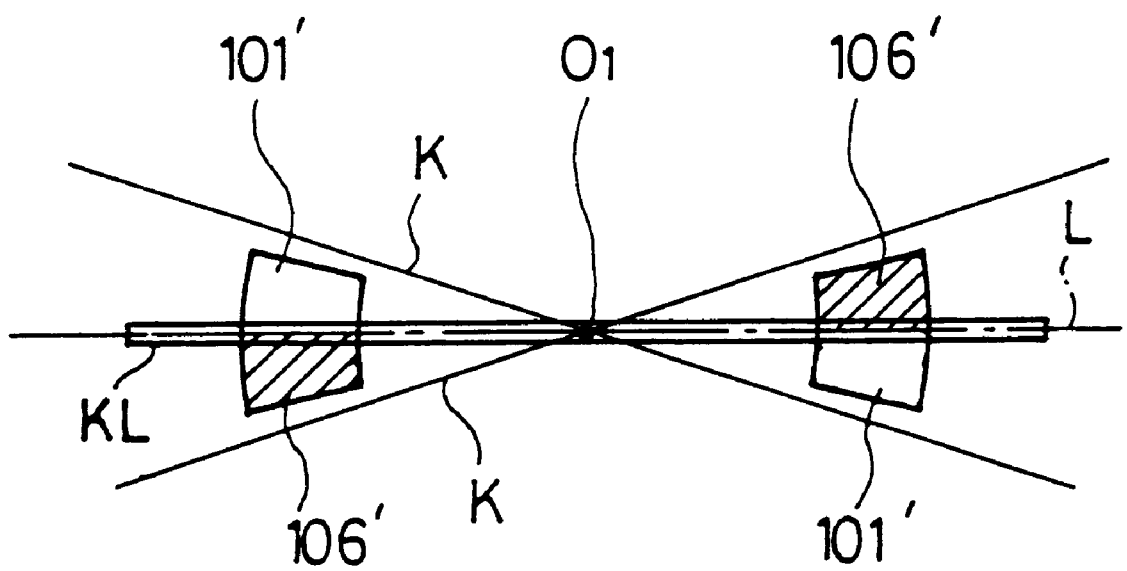
FIG. 20 is a diagram showing an alternative of the state where the retroreflection plate shave been disposed.

Also, the time tm' is obtained by averaging the times t1' and t2'. Based on the average of the times tm and tm', the time for driving the motor 46 is set. If done in this way, the linear indicator beam K can be automatically aligned with the collimation direction L, as in the fourth embodiment. Therefore, the guide beam P is aligned with the collimation direction L. In this fifth embodiment, the guide beam P is aligned with the collimation direction L, based on the detected outputs of two pairs of retroreflection plates. Therefore, as compared with the fourth embodiment, the alignment accuracy can be further enhanced. In the case of the motor 46 with an encoder, the driving time can be obtained by using angles instead of the aforementioned times. As shown in FIG. 20, two retroreflection surfaces 101' i the form of a circular arc plate may be provided symmetrically with respect to the optical axis 01, and quarter-wave plates 106' may be provided on one side of each surface 101' with respect to the collimation direction L, respectively.

If done in this way, the detected output, based on the reflected beam K' of the linear indicator beam K from the place where the quarter-wave plate has been provided, and the detected output, based on the reflected beam K' of the linear indicator beam K from the place where the quarter-wave plate has not been provided, will be come identical when the linear indicator beam K is just superimposed on the collimation direction L, as shown by reference character KL in FIG. 20. Therefore, by detecting the difference between both detected outputs, the collimation direction L can be detected independent of time and angle (for the detailed construction, see Japan Laid-Open Patent Publication no. HEI 7-83656).

Note that if the rotation control means 104 is controlled by a remote controller (not shown), remote control will become easy.

According to the fourth and fifth embodiments, the detection means receives the linear indicator beam reflected by the retroreflection plates, and the rotation control means automatically controls the optical indicator-beam emission system so that the emission direction of the guide beam is aligned with the collimation direction, based on the detected output of the detection means. Therefore, the collimation direction and the emission direction of the guide laser beam can be automatically aligned.

Sixth Embodiment

Figure 21:
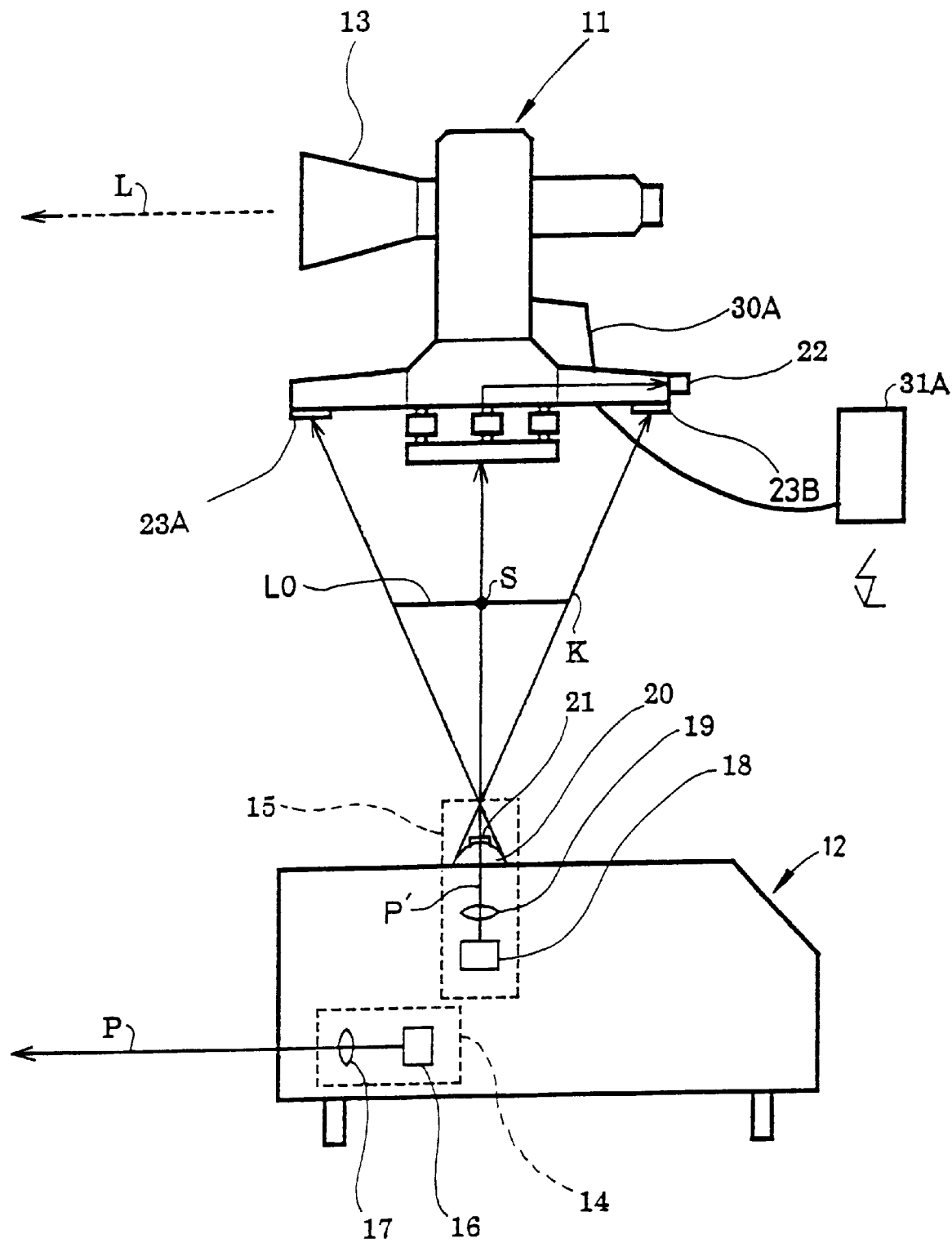
FIG. 21 is a schematic view showing a guide beam direction setting apparatus according to a sixth embodiment of the present invention.

Referring to FIG. 21, there is shown a guide beam direction setting apparatus constructed in accordance with a sixth embodiment of the present invention. FIG. 21 schematically illustrates the positional relationship between a surveying machine 11 and a guide beam generator 12 according to this embodiment.

In the figure, the same reference numerals and the same reference characters will be applied to the same parts as FIG. 3 to omit the detailed description, and the differing parts will be described.

Figure 22:
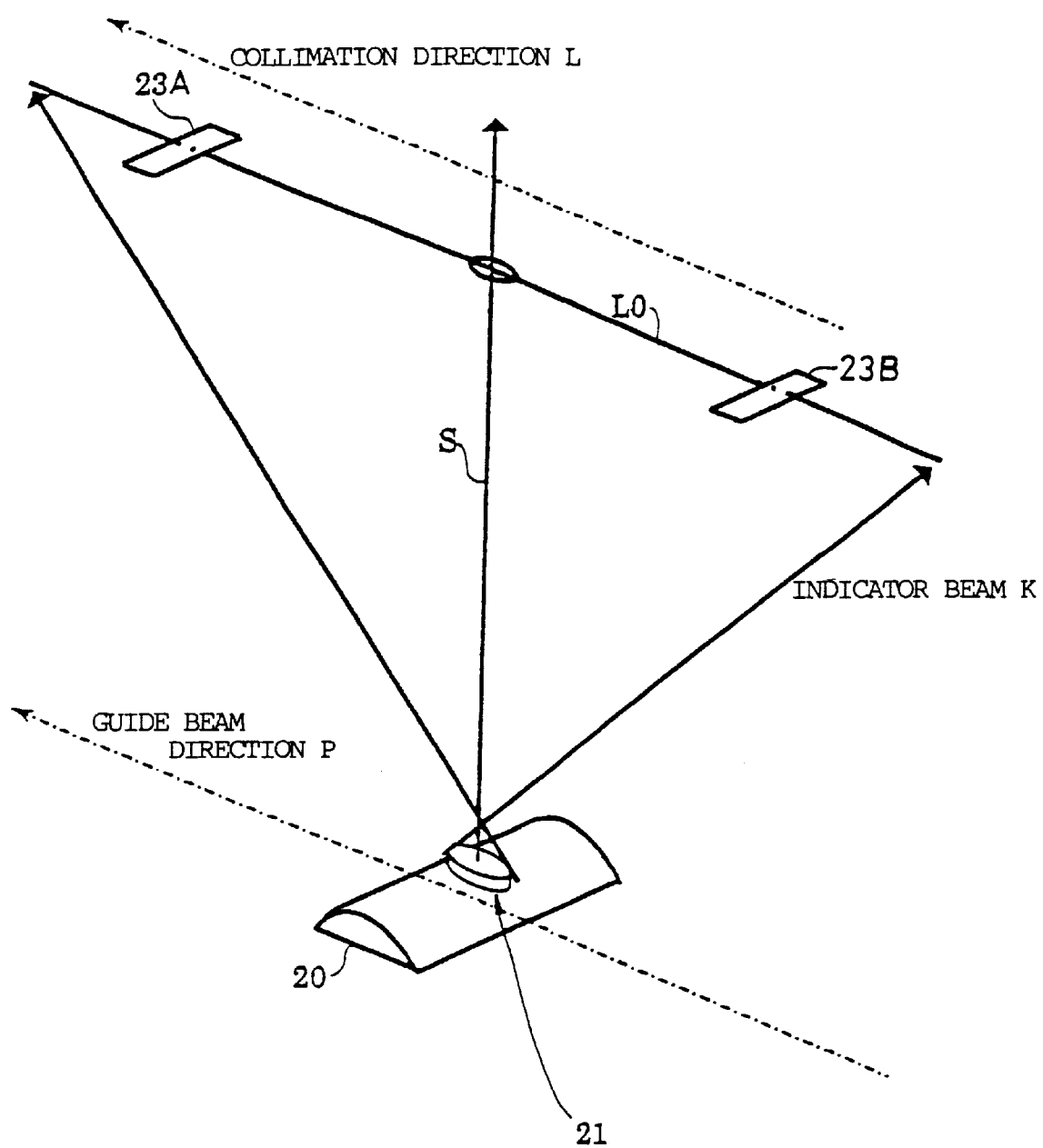
FIG. 22 is a perspective view showing the positional relationship between the cylindrical lens and the photosensor array shown in FIG. 21.

A parallel plane portion 21 (see FIG. 22) formed on the top of a cylindrical lens 20 is employed for forming a spot beam S, as previously described. In this embodiment an optical indicator-beam emission system 15 is constructed so that a laser beam P' is emitted vertically by vertical correction means (not shown). The laser beam P' in this embodiment is modulated.

The spot S beam is the center of the optical axis and also is the center of rotation for horizontally rotating an optical guide-beam emission system 14. By aligning the spot beam S with the center of a spherical center telescope 22, the center of rotation of a surveying machine 11 and the center of rotation of the optical guide-beam emission system 14 are aligned.

Figure 23:
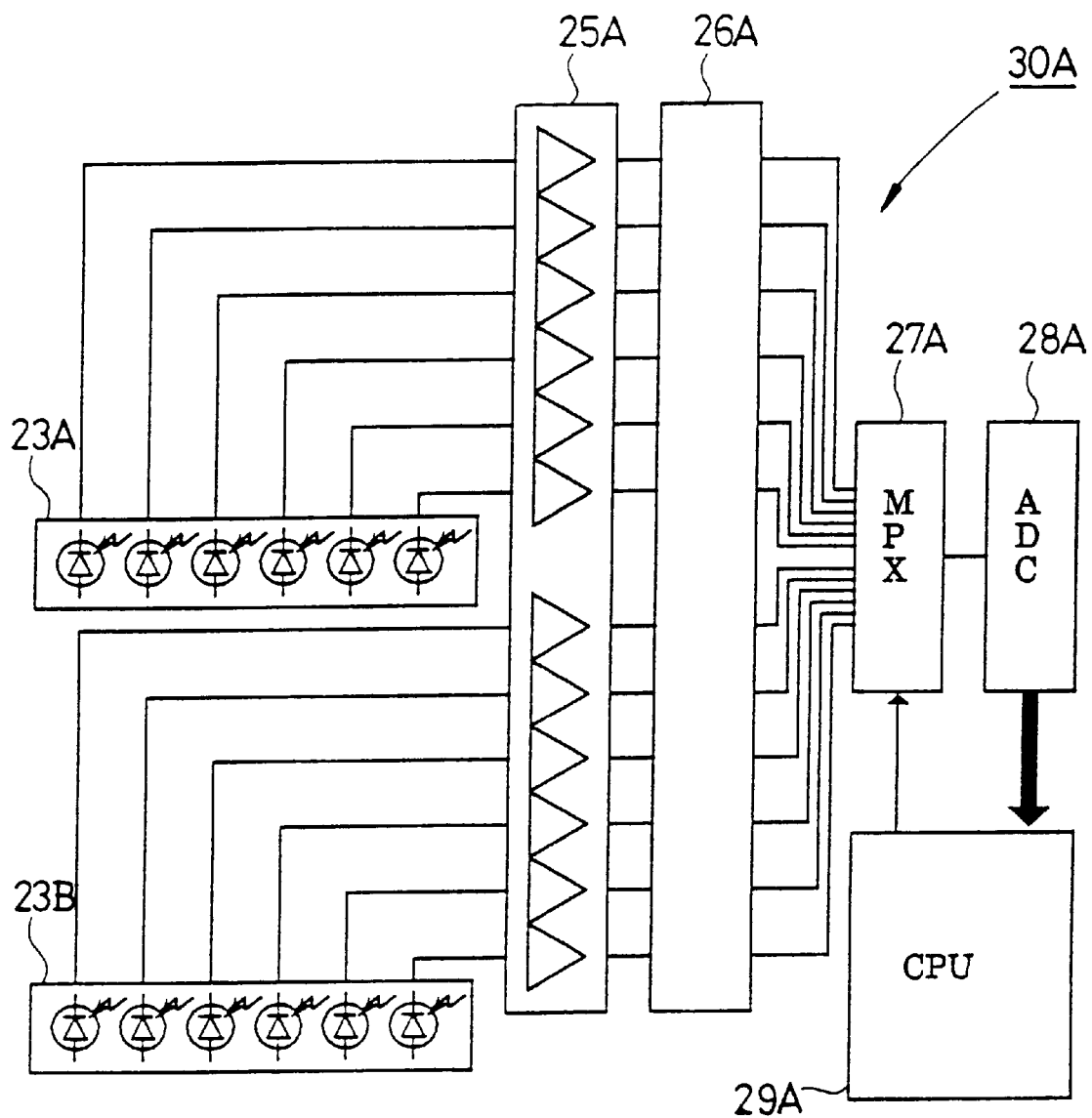
FIG. 23 is a block diagram of the detection means which brings in an indicator beam by means of the photosensor array shown in FIG. 21 and detects the offset of the emission direction of the indicator beam to the collimation direction L.

The surveying machine 11 is provided with a pair of a first photosensor array 23A and a second photosensor array 23B spaced in parallel in the collimation direction L, and the photosensor arrays form part of the detection means. In this embodiment the longitudinal direction of each of the photosensor arrays 23A and 23B crosses the collimation direction L. Each of the photosensor arrays 23A and 23B uses a photodiode array, as shown in FIG. 23. The output of each of the photosensor arrays 23A and 23B is input to the detecting section 30A shown in FIG. 21.

The collimation direction L and the direction in which the indicator beam K extends are generally offset from each other. The first and second photodiode arrays 23A and 23B have 6 channels in this embodiment.

The indicator beam K is incident on the first and second photodiode arrays 23A and 23B, and photoelectric conversion is performed. The indicator beam K is input to an amplifying section 25A as a light received signal and is amplified. The modulation of the signal amplified by the amplifying section 25A is removed by a wave detecting section 26A and is converted to a dc voltage signal. The dc voltage signal (light received signal) is input to a multiplexer 27A.

The multiplexer 27A selects any one of the channels by a control signal from a central processing unit (CPU) 29A and outputs the dc voltage current (light received signal) to an A/D converter 28A. The A/D converter 28A converts the light received signal to a digital value. The digital value is input to the CPU 29A, which performs processing which will hereinafter be described.

The light quantity data row of the quantity Sx of received light of each of channels 0 through 5 of the first photodiode array 23A is taken to be X and the light quantity data row of the quantity Sy of received light of the second photodiode array 23B is taken to be Y. Then, the correlation coefficient is calculated between the same channels by employing the following Eq (1).

$$r^2 = \{\Sigma(Xi-\bar{X})(Yi-\bar{Y})\}/\{\Sigma(Xi-\bar{X})^2(Yi-\bar{Y})^2\} \quad (1)$$

(positive correlation if the numerator is positive whereas negative correlation if the numerator is negative)

wherein $\bar{X}=\Sigma X/n$, $\bar{Y}=\Sigma Y/n$.

Figure 24:
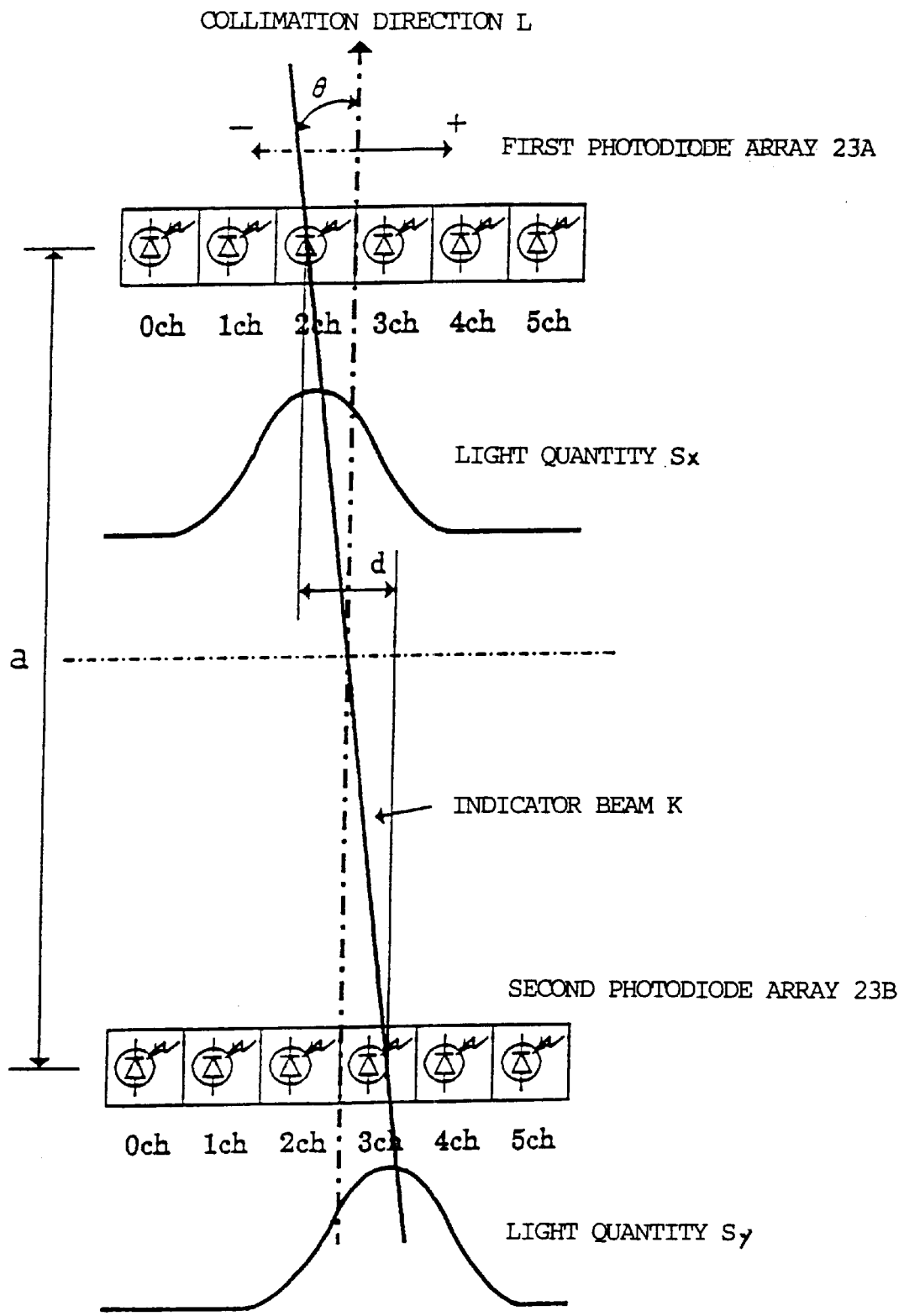
FIG. 24 is a diagram used to explain the state where the indicator beam with the emission direction offset from the collimation direction is incident on the photosensor array.
Figure 25:
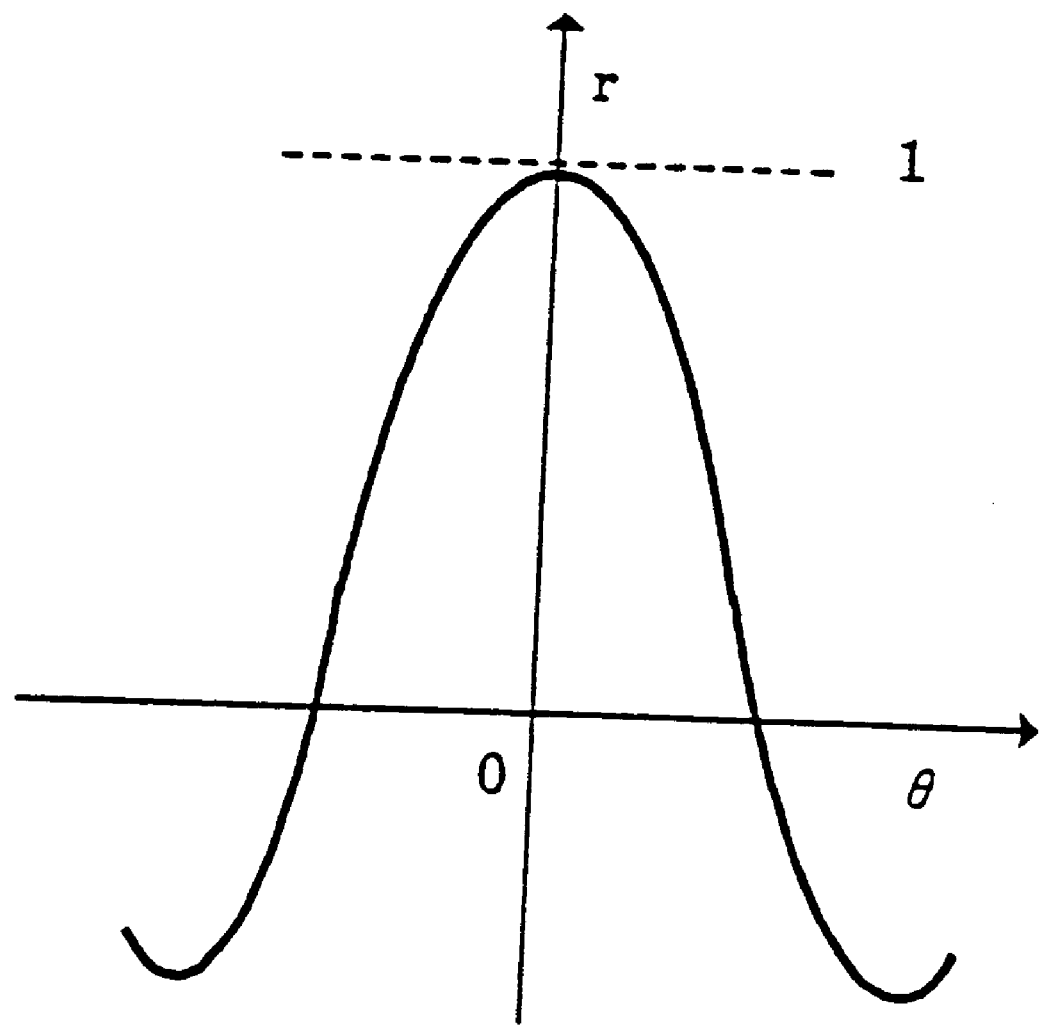
FIG. 25 is a diagram showing the change curve of a correlation coefficient ($\tau$) based on a change in the angle $\theta$ formed between the collimation direction and the indicator beam.

The correlation coefficient, r, becomes maximum when a curve of light quantity Sx and a curve of light quantity Sy shown in FIG. 24 are aligned. As the offset between these curves becomes larger, the correlation coefficient, r, becomes smaller. Therefore, if the value of the correlation coefficient r is graphed with respect to a change in the angle θ (see FIG. 24) which is formed between the collimation direction L and the extending direction of the indicator beam k, a curve shown in FIG. 26 will be obtained.

The direction of the guide beam P can be aligned with the collimation direction L by rotating the emission direction of the guide beam P correspondingly to the indicator beam K by using remote control so that the correlation coefficient, r, becomes maximum. Conversely, the collimation direction L can also be aligned with the emission direction of the guide beam P by rotating the collimation direction L so that the correlation coefficient, r, becomes maximum. Note that since the correlation can be calculated by using only the numerator of Eq. (1), the detecting section 30A can be constituted by employing an analog circuit.

The automation of a system for aligning the direction of the guide beam P with the collimation direction L is possible by controlling the rotation drive system (not shown) of the optical guide-beam emission system 14 via the remote controller 31A (see FIG. 21), based on the correlation output (i.e., an output corresponding to the correlation efficient r). Also, the automation of a system for aligning the collimation direction L with the direction of the guide beam P is possible by providing a drive system in the rotational mechanism (not shown) of the collimation direction L and controlling this drive system by the correlation output.

According to this embodiment, it is possible to align the collimation direction L with the direction of the guide beam P. However, in the system automation it is desirable that the direction to be controlled is detected near the alignment between the emission direction of the guide beam P and the collimation direction L. If done in this way, control will become simple and control speed can be accelerated. This will hereinafter be described with a seventh embodiment.

Seventh Embodiment

Figure 26:
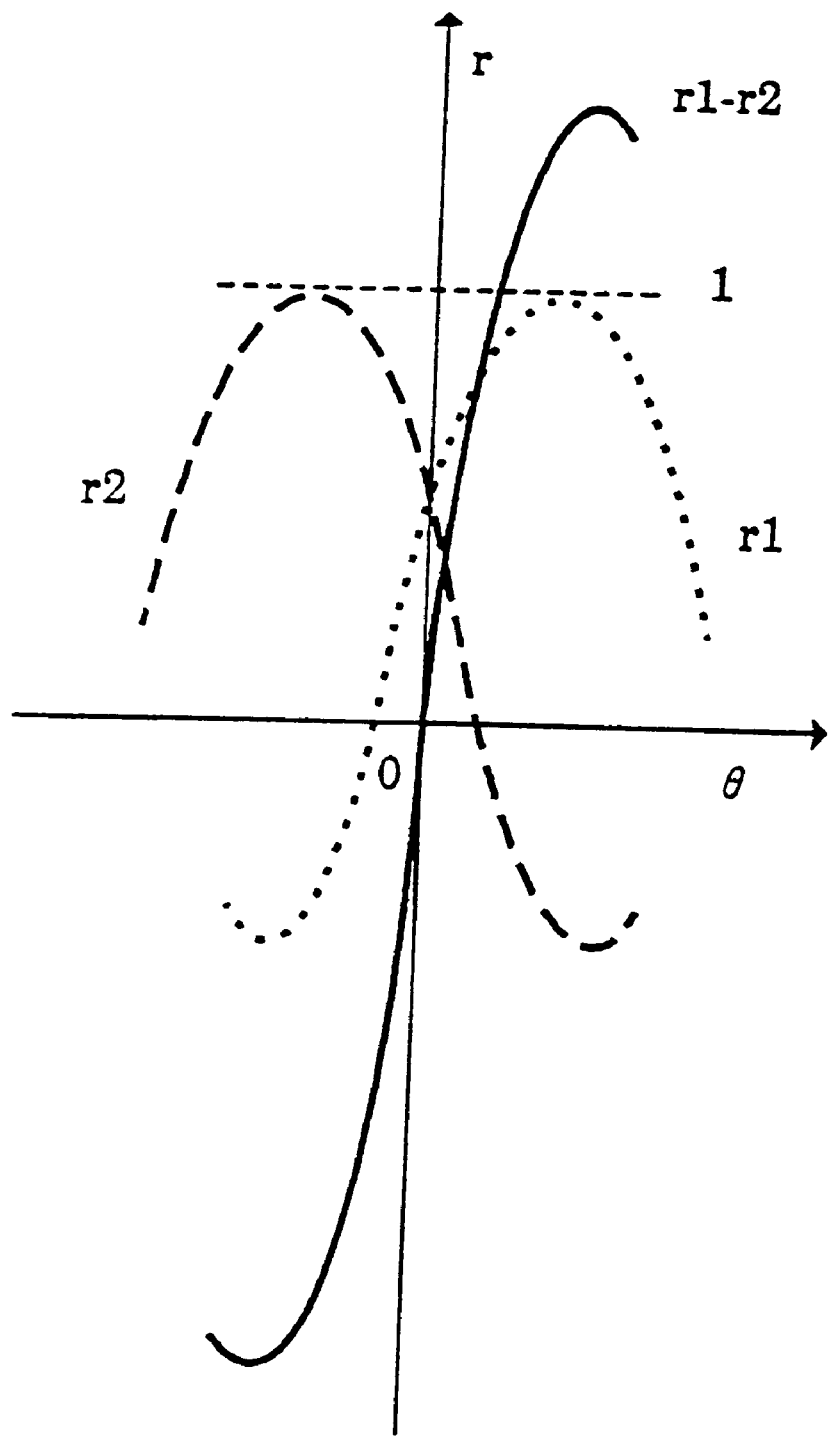

Referring to FIG. 26, there is shown a guide beam direction setting apparatus constructed in accordance with a seventh embodiment of the present invention. As with the sixth embodiment, the quantities of received light of the photodiode arrays 23A and 23B are taken into the CPU 29A as data. The data row of the quantity Sx of received light of the first photodiode array 23A is shifted one channel. Then, there is obtained a correlation coefficient r1 between the data row of this shifted light quantity Sx and the data row of the quantity Sy of received light of the second photodiode array 23B. If done in this way, the correlation coefficient r1 with respect to a change in the angle θ between the collimation direction L and the indicator beam K is shown by a curve indicated by a dotted line in FIG. 26. Next, the data row of the quantity Sx of received light of the first photodiode array 23A is shifted one channel in the opposite direction. Then, there is obtained a correlation r2 between the data row of this shifted light quantity Sx and the data row of the quantity Sy of received light of the second photodiode array 23B. If done in this way, the correlation coefficient r2 with respect to a change in the angle θ between the collimation direction L and the indicator beam K is shown by a curve indicated by a broken line in FIG. 26.

If the difference r1−r2 between the correlation coefficient r1 and r2 is calculated, there is obtained a curve shown by a solid line in FIG. 26. Based on whether the sign of this difference r1−r2 is positive or negative, it can be judged whether the angle θ between the collimation direction L and the indicator beam K has a positive direction or a negative direction. In this way, the direction to be controlled can be determined. When the difference r1−r2 is zero, it is meant that the indicator beam K and the collimation direction L are aligned. Therefore, when the difference r1−r2 is zero, the direction of the guide beam P and the collimation direction L can be aligned if rotation is stopped.

Eighth Embodiment

Referring to FIG. 27, there is shown a guide beam direction setting apparatus constructed in accordance with an eighth embodiment of the present invention.

As with the sixth embodiment, the quantities of received light of the photodiode arrays 23A and 23B are taken into the CPU 29A as data.

Next, the data row of the quantity Sx of received light of the first photodiode array 23A is taken to be X and the data row of the quantity Sy of received light of the second photodiode array 23B is taken to be Y. A correlation coefficient r0 is obtained. Next, the data row X of the quantity Sx of received light of the first photodiode array 23A is shifted one channel in the direction where the number of channels is reduced. The data row obtained by this shifting is taken to be X'. Then, there is obtained a correlation coefficient r1 between this shifted data row X' and the data row Y of the quantity Sy of received light of the second photodiode array 23B. The correlation coefficient r1 is a correlation coefficient equivalent to the correlation coefficient in the state where the indicator beam K incident on the first photodiode array 23A has been shifted left by the amount of one pitch of the first photodiode array 23A.

Similarly, the data row X of the quantity Sx of received light of the first photodiode array 23A is shifted two channels in the direction where the number of channels is reduced. The data row obtained by this shifting is taken to be X". Then, there is obtained a correlation coefficient r2 between this shifted data row X" and the data row Y of the quantity Sy of received light of the second photodiode array 23B. This correlation coefficient r2 is a correlation coefficient equivalent to the correlation coefficient in the state where the indicator beam K incident on the first photodiode array 23A has been shifted left by the amount of the pitches of the first photodiode array 23A.

Next, there is performed a process of shifting the data row X of the quantity Sx of received light of the first photodiode array 23A in the opposite direction. That is, the data row of the quantity Sx of received light of the first photodiode array 23A is shifted one channel in the direction where the number of channels is increased. Then, there is obtained a correlation coefficient −r1 between the data row of this shifted light quantity Sx and the data row of the quantity Sy of received light of the second photodiode array 23B. The correlation coefficient −r1 is a correlation coefficient equivalent to the correlation coefficient in the state where the indicator beam K incident on the first photodiode array 23A has been shifted right by the amount of one pitch of the first photodiode array 23A.

In the same way, the data row of the quantity Sx of received light of the first photodiode array 23A is shifted two channels in the direction where the number of channels is increased. Then, there is obtained a correlation coefficient −r2 between the data row of this shifted light quantity Sx and the data row of the quantity Sy of received light of the second photodiode array 23B. The correlation coefficient −r2 is a correlation coefficient equivalent to the correlation coefficient in the state where the indicator beam K incident on the first photodiode array 23A has been shifted right by two pitches of the first photodiode array 23A.

In the aforementioned way, there are obtained the equivalent correlation coefficients −r2, −r1, r0, r1, and r2 where the first photodiode array has been shifted one pitch at a time. If a graph is made with the correlation coefficients −r2, −r1, r0, r1, and r2 taken on y-axis and the shifted pitch taken on x-axis, black points (black circles) are obtained as shown in FIG. 27.

In order to obtain the position of the maximum value of the correlation coefficients within the pitch, the obtained five correlation coefficients are interpolated to obtain a graph shown by a broken line in FIG. 27. By obtaining the position at which the correlation coefficient becomes maximum, there can be obtained an offset quantity (d) between the position of the indicator beam K incident on the second photodiode array 23B and the position of the indicator beam K incident on the first photodiode array 23A.

As an example, a description will hereinafter be given of the case where Newton interpolation is employed.

If the pitch is taken to be x, the value of the x-axis of the correlation coefficient −r2 is −2x. The value of the x-axis of the correlation coefficient −r is −x, the value of the x-axis of the correlation coefficient r0 is 0, the value of the x-axis of the correlation coefficient r1 is x, and the value of the x-axis of the correlation coefficient r2 is 2x.

In order to obtain a polynomial which passes through the five points, Table 1 is made.

TABLE 1

| | | | |
|---|---|---|---|
| −2x | −r2 | c0 = (−r1−(−r2))/(−x−(−2x)) | |
| −x | −r1 | c1 = (r0−(−r1))/(0−(−x)) | d0 = (c1 − c0)/(0−(−2x)) |
| 0 | 0 | c2 = (r1 − r0)/(x − 0) | d1 = (c2 − c1)/(x−(−x)) |
| | | e0 = (d1 − d0)/(x−(−2x)) | |
| x | r | c3 = (r2 − r1)/(2x − x) | d2 = (c3 − c2)/(2x − 0) |
| | | e1 = (d2 − d1)(2x−(−x)) | f0 = (e1 − e0)/(2x−(−2x)) |
| 2x | r2 | | |

If the c0, d0, e0, and f0 are employed, the function to be obtained will be as follows:

$$y=(((f0*(d-x)+e0)*(d-0)+d0)*(d-(-x)+c0)*(d-(-2x))+(-2r)$$

If the desired correlation coefficient on x-axis is obtained and interpolated by substituting a numerical value into the offset quantity d, the graph shown by a broken line in FIG. 27 will be obtained. By obtaining the offset quantity d where the correlation coefficient becomes maximum, there can be obtained the offset quantity d between the position of the indicator beam K incident on the second photodiode array 23B and the position of the indicator beam K incident on the first photodiode array 23A.

If the offset quantity between the position of the indicator beam K incident on the second photodiode array 23B and the position of the indicator beam K incident on the first photodiode array 23A is taken to be "d" and the distance between the first and second photodiode arrays 23A and 23B is taken to be "a," the angle θ between the collimation direction L and the indicator beam K will be obtained by the following Eq. (2).

$$\theta=\tan^{-1}(d/a) \quad (2)$$

The guide beam P and the collimation direction L may be automatically aligned based on the offset between the indicator beam K and the collimation direction L obtained in the sixth to the eighth embodiments.

In the sixth to the eighth embodiments, a description has been given of the case where the correlation coefficient r is obtained by using a single fan-shaped indicator beam K. However, the present invention is not limited to this case.

Figure 28:
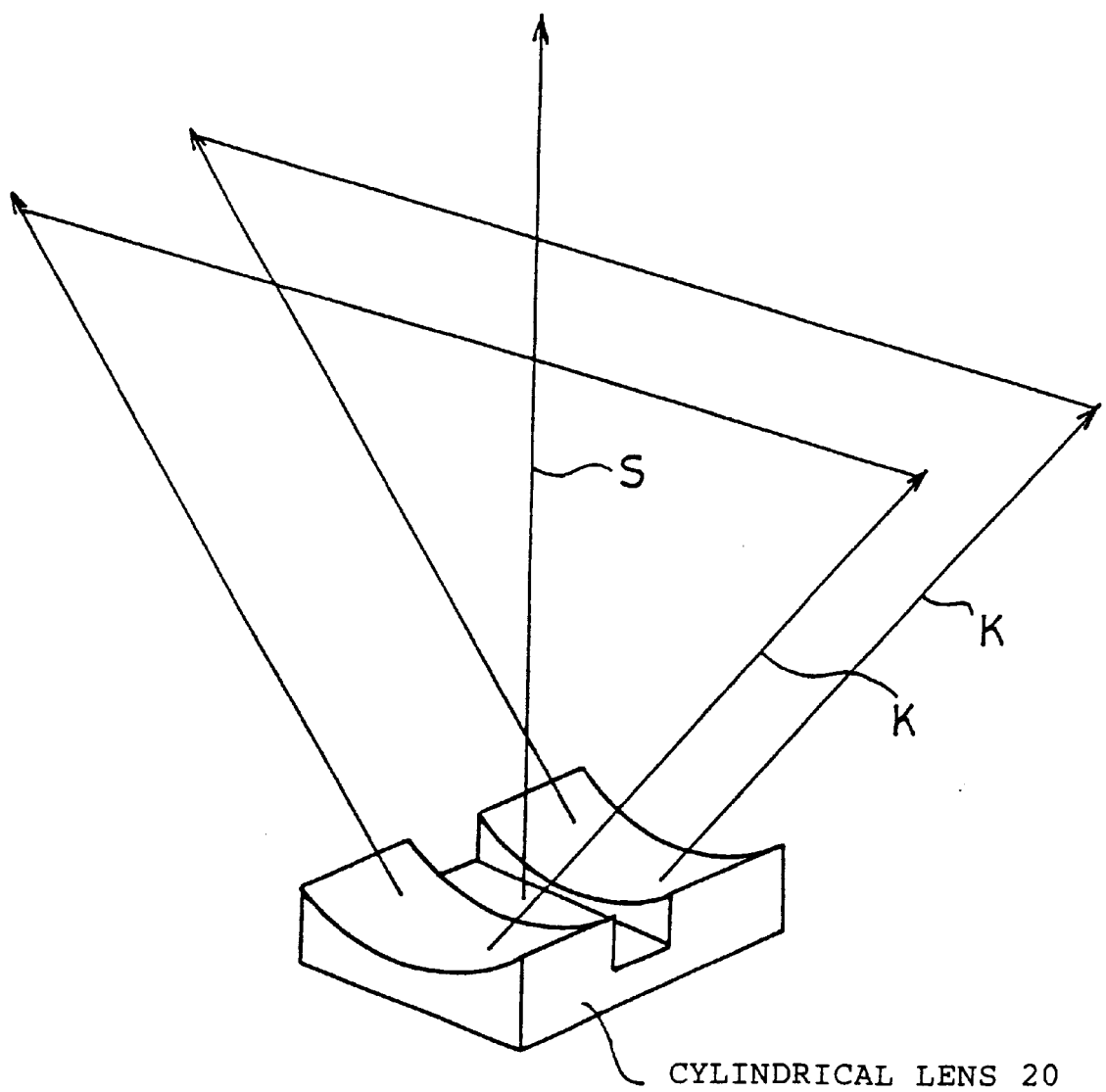
FIG. 28 is a diagram showing a change in the difference r1–r2 between correlation coefficients with respect to the angle $\theta$ formed between the collimation direction and the indicator beam.
Figure 29:
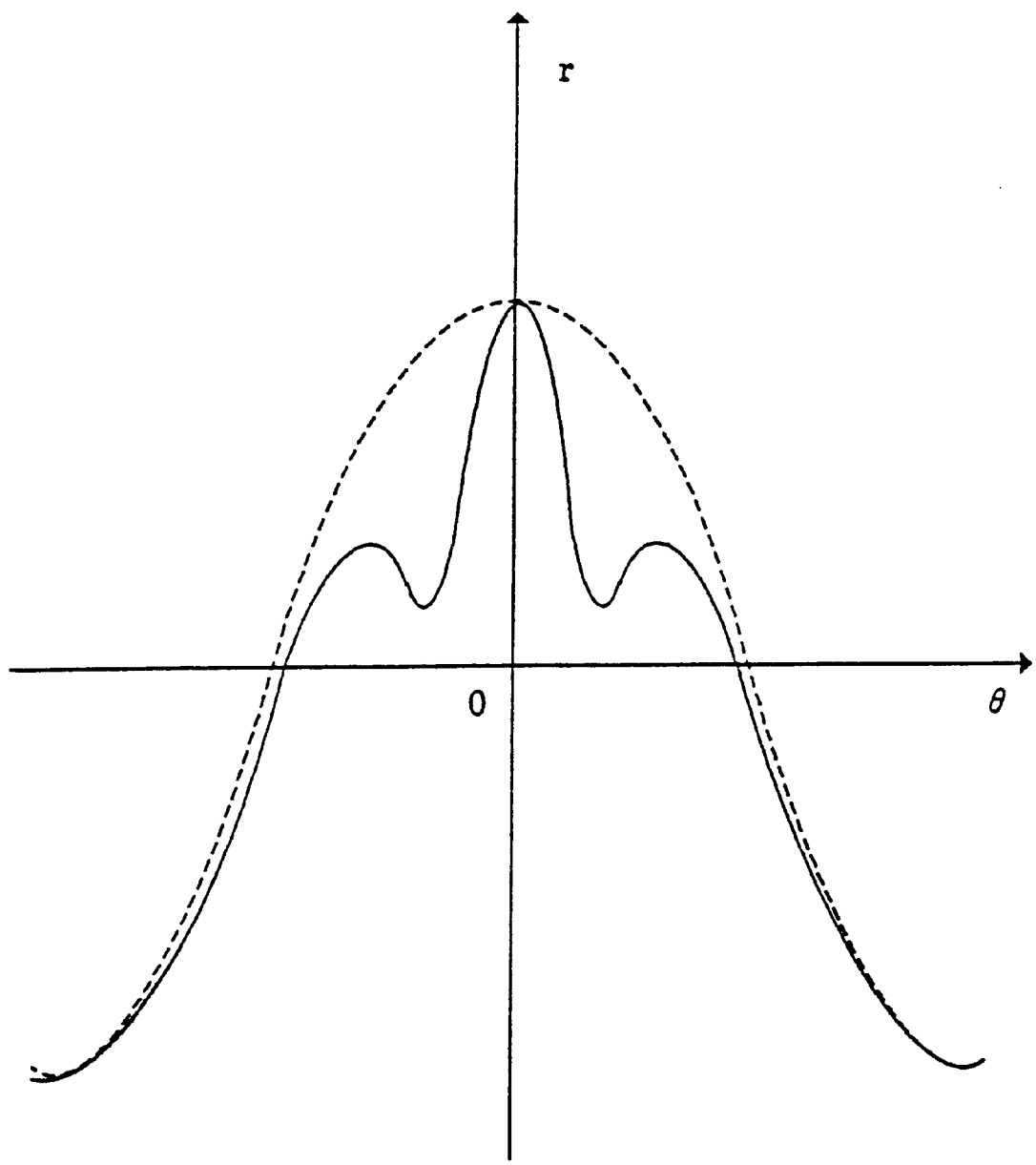
FIG. 29 is a diagram showing a change in the correlation coefficient with respect to the angle $\theta$ formed between the collimation direction and the indicator beam in the case where the cylindrical lens shown in FIG. 28 is employed.

For example, a plurality of indicator beam K may be generated by employing a cylindrical lens 20 having a shape shown in FIG. 28, and a correlation coefficient r may be between the quantity Sx of received light of the first photodiode array 23A and the quantity Sy of received light of the second photodiode array 23B If done in this way, the correlation coefficient based on the θ between the collimation direction L and the indicator beam K will be obtained as shown by a solid line in FIG. 28. The graph shown by a broken line in FIG. 29 corresponds to the case of a single indicator beam K. If a plurality of indicator beams, for example, two indicator beams are employed, the width of the peak portion can be narrowed and therefore accuracy can be enhanced.

Figure 30:
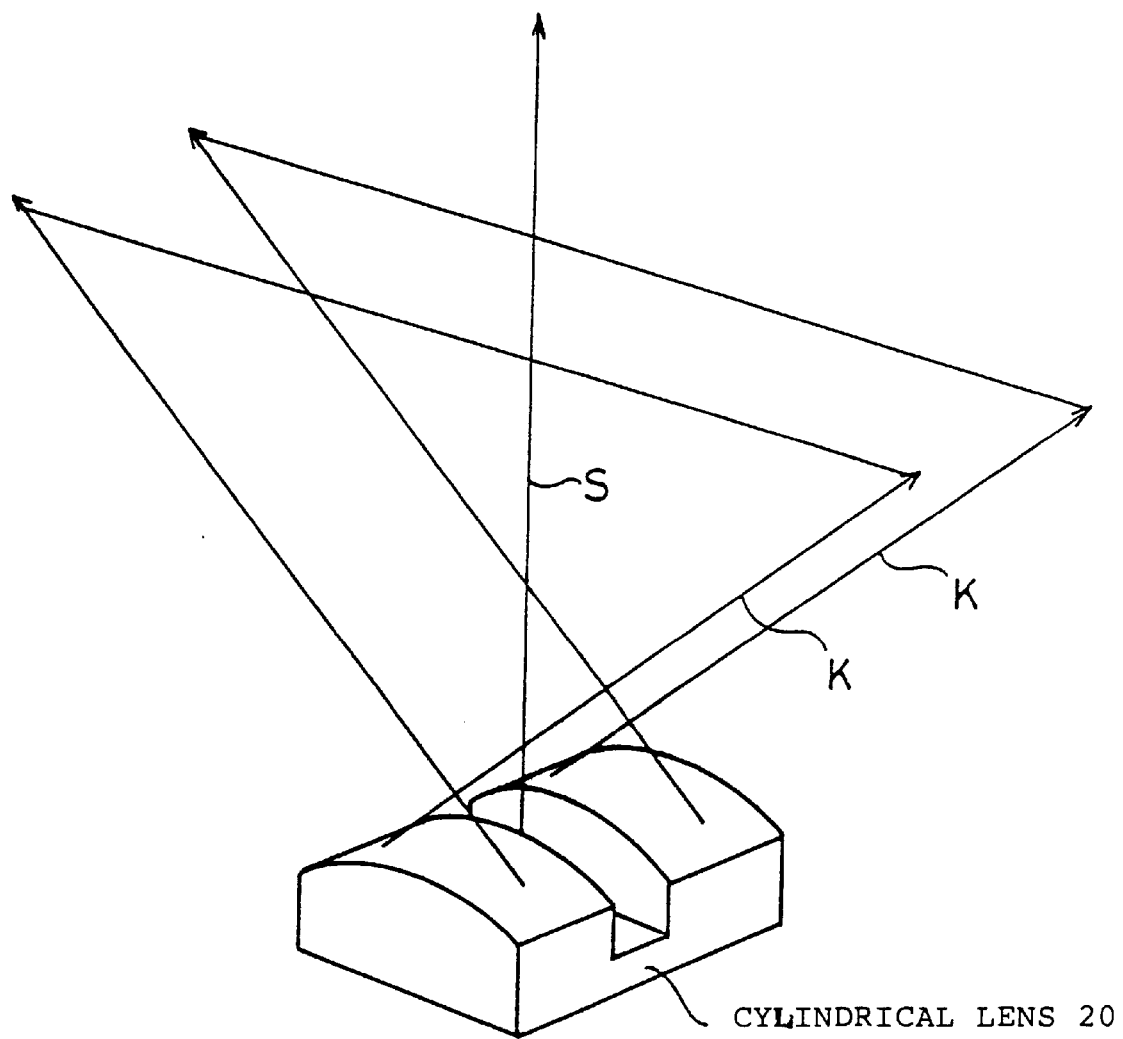
FIG. 30 is a perspective view showing another alternative of the cylindrical lens.

While the cylindrical lens 20, shown in FIG. 28, is concave in shape, a convex cylindrical lens 20 may be employed as shown in FIG. 30.

According to the sixth to the eighth embodiments, the emission direction of the guide beam P can be easily and quickly aligned with the collimation direction only by rotating either the emission direction of the guide beam P or the collimation direction L.

In addition, since the offset of the indicator beam K to the collimation direction L can be accurately detected, the emission direction of the guide beam P can be aligned with the collimation direction L with a high degree of accuracy.

Furthermore, it can be judged by computers whether the emission direction of the guide beam P has been aligned with the collimation direction L, and consequently the time required for setting a digging direction can be considerably reduced.

Finally, the mutual position between the guide beam generator and the surveying machine 11 can be accurately and quickly determined.

What is claimed is:

1. A guide beam direction setting apparatus comprising:
   a guide beam generator having a guide-beam emission optical system for emitting a guide beam of light;
   an indicator-beam emission optical system for emitting an indicator beam of light having a flat spatial spread, said indicator-beam emission optical system having a semiconductor laser wherein a direction in which a spreading angle of a laser beam is large corresponds to an emission direction of said guide beam; and
   detection means for detecting said indicator beam;
   wherein said detection means is disposed so as to correspond to a collimation direction of collimation direction means and be spaced from said indicator-beam emission optical system, and the emission direction of said guide beam is aligned with said collimation direction by detecting said indicator beam with said detection means;
   wherein said indicator beam includes a spot beam which prescribes the center of an optical axis; and
   wherein said indicator beam is seen as linearly extending in the emission direction of said guide beam when viewed from the side where said collimation direction means is disposed, and said optical indicator-beam emission optical system is provided with a diaphragm plate having a slit for diffracting said laser beam, said slit extending long in the emission direction of said guide beam.

2. The guide beam direction setting apparatus as set forth in claim 1, wherein said indicator-beam emission optical system includes a cylindrical lens for forming a linear laser beam which is seen as linearly extending in the emission direction of said guide beam when viewed from the side where said collimation direction means is disposed, based on a laser beam emitted from said semiconductor laser, and said diaphragm plate is disposed in the rear of or in front of said cylindrical lens.

3. The guide beam direction setting apparatus as set forth in claim 1, wherein said detection means is provided with a reflecting system which spatially inverts a linear laser beam, which is seen as linearly extending in the emission direction of said guide beam when viewed from the side where said collimation direction means is disposed, with respect to the collimation direction.

4. A guide beam direction setting apparatus comprising:
   a guide beam generator having a guide-beam emission optical system for emitting a guide beam of light;
   an indicator-beam emission optical system for emitting an indicator beam of light having a flat spatial spread, said indicator-beam emission optical system having a semiconductor laser wherein a direction in which a spreading angle of a laser beam is large corresponds to a collimation device; and detection means for detecting said indicator beam;

wherein said detection means is disposed so as to correspond to an emission direction of said guide beam and be spaced from said indicator-beam emission optical system, and the emission direction of said guide beam is aligned with said collimation direction by detecting said indicator beam with said detection means;

wherein said indicator beam includes a spot beam which prescribes the center of an optical axis; and wherein said indicator beam is seen as linearly extending in the collimation direction when viewed from the side where said guide beam generator is disposed, and said optical indicator-beam emission optical system is provided with a diaphragm plate having a slit for diffracting said laser beam, said slit extending long in said collimation direction.

5. The guide beam direction setting apparatus as set forth in claim 4, wherein said indicator-beam emission optical system includes a cylindrical lens for forming a linear laser beam which is seen as linearly extending in the collimation direction when viewed from the side where said guide beam generator is disposed, based on a laser beam emitted from said semiconductor laser, and said diaphragm plate is disposed in the rear of or in front of said cylindrical lens.

6. The guide beam direction setting apparatus as set forth in claim 4, wherein said detection means is provided with a reflecting system which spatially inverts a linear laser beam, which is seen as linearly extending in the collimation direction when viewed from the side where said guide beam generator is disposed, with respect to the emission direction of said guide beam.

7. A guide beam direction setting apparatus comprising:

a main body;

a guide beam generator provided in said main body and having a guide-beam emission optical system for emitting a guide beam of light;

an indicator-beam emission optical system, provided in said main body, for emitting a linear indicator beam which is seen as linearly extending in an emission direction of said guide beam when viewed from the side where collimation direction means is disposed;

a pair of retroreflection plates disposed with respect to a collimation direction of said collimation direction means and spaced from said main body, the retroreflection plates being adapted for reflecting said linear indicator beam toward said indicator-beam emission optical system;

detection means, provided in said main body, for detecting said linear beam reflected toward said indicator-beam emission optical system by said pair of retroreflection plates; and rotation control means, provided in said main body, for rotating and controlling said indicator-beam emission optical system so that the emission direction of said guide beam is aligned with said collimation direction, based on a detected output of said detection means.

8. The guide beam direction setting apparatus as set forth in one of claims 7, wherein said rotation control means can be remotely controlled.

9. A guide beam direction emitting apparatus comprising:

a main body;

a guide beam generator provided in said main body and having a guide-beam emission optical system for emitting a guide beam of light;

an indicator-beam emission optical system, provided in said main body, for emitting a linear indicator beam which is seen as linearly extending in an emission direction of said guide beam when viewed from the side where collimation direction means is disposed;

two pairs of retroreflection plates disposed with respect to said collimation direction means and spaced from said main body, the retroreflection plates being provided at symmetrical positions with respect to an optical axis of said indicator-beam emission optical system and being adapted for reflecting said linear indicator beam toward said indicator-beam emission optical system;

detection means, provided in said main body, for detecting said linear indicator beam reflected toward said indicator-beam emission optical system by said two pairs of retroreflection plates; and rotation control means, provided in said main body, for rotating and controlling said indicator-beam emission optical system so that the emission direction of said guide beam is aligned with said collimation direction, based on a detected output of said detection means.

10. The guide beam direction setting apparatus as set forth in claim 9, wherein said linear indicator beam is circularly polarized light;

one of said two pairs of retroreflection plates is provided with a quarter-wave plate;

said detection means is provided with a polarizing beam splitter by which a linear indicator beam reflected by the pair of retroreflection plates having said quarter-wave plate and a linear indicator beam reflected by the pair of retroreflection plates having no quarter-wave plate are separated from each other;

said detection means is provided with a pair of light receiving elements for receiving both one pair of linear indicator beams transmitted through said polarizing beam splitter and another pair of linear indicator beams transmitted through said polarizing beam splitter; and said rotation control means rotates and controls said indicator-beam emission optical system, based on detected outputs of said pair of light receiving elements.

11. A guide beam direction setting apparatus comprising:

a main body;

a guide beam generator provided in said main body and having a guide-beam emission optical system for emitting a guide beam of light;

an indicator-beam emission optical system, provided in said main body, for emitting a linear indicator beam which is seen as linearly extending in an emission direction of said guide beam when viewed from the side where collimation direction means is disposed;

retroreflection plates spaced from said main body, the retroreflection plates being adapted for reflecting said linear indicator beam toward said indicator-beam emission optical system and being provided with quarter-wave plates on one side with respect to a collimation direction of said collimation direction means;

detection means, provided in said main body, for detecting both the linear indicator beam reflected by the retroreflection plates having said quarter-wave plates and the linear indicator beam reflected by the pair of retroreflection plates having no quarter-wave plates; and rotation control means, provided in said main body, for rotating and controlling said indicator-beam emission optical system so that the emission direction of said guide beam is aligned with said collimation direction, based on a difference between both detected outputs of said detection means.

12. A guide beam direction setting apparatus comprising:
   a guide beam generator having a guide-beam emission optical system for emitting a guide beam and an indicator-beam emission optical system for emitting a fan-shaped indicator beam which is seen as linearly extending in an emission direction of said guide beam from the side where collimation direction means is disposed; and
   detection means provided in said collimation direction means;
   wherein said detection means has a first photosensor and a second photosensor, spaced in a collimation direction, for receiving said indicator beam, and a directional relationship between said guide beam and said collimation direction is obtained from a positional relationship between said indicator beam on said first photosensor and said indicator beam on said second photosensor.

13. The guide beam direction setting apparatus as set forth in one of claims 12, wherein said fan-shaped indicator beam has a spot beam which indicates a center of an optical axis of said optical guide-beam emission system.

14. A guide beam direction setting apparatus comprising:
   a guide beam generator having a guide-beam emission optical system for emitting a guide beam;
   collimation direction setting means having an indicator-beam emission optical system for emitting a fan-shaped indicator beam which is seen as extending in a collimation direction from the side where said guide beam generator is disposed; and
   detection means provided in said guide beam generator;
   wherein said detection means has a first photosensor and a second photosensor, spaced in an emission direction of said guide beam, for receiving said indicator beam, and a directional relationship between said guide beam and said collimation direction is obtained from a positional relationship between said indicator beam on said first photosensor and said indicator beam on said second photosensor.

15. The guide beam direction setting apparatus as set forth in claim 14, wherein a light-received signal from said first photosensor and a light-received signal from said second photosensor are correlatively processed between corresponding channels, and when a correlation state is maximum, it is judged that said guide beam and said collimation direction have been aligned.

16. The guide beam direction setting apparatus as set forth in claim 14, further comprising:
   means for modulating said indicator beam;
   a wave detecting section for detecting a modulated light-received signal from said first photosensor and a modulated light-received signal from said second photosensor;
   an A/D conversion section for converting an analog signal output from said wave detecting section to a digital value; and
   an arithmetic processing section for processing data output from said A/D conversion section;
   wherein data from said first photosensor and data from said second photosensor are correlatively processed between corresponding channels, and when a correlation state is maximum, it is judged that said guide beam and said collimation direction have been aligned.

17. The guide beam direction setting apparatus as set forth in claim 14, wherein a light-received signal from said first photosensor and a light-received signal from said second photosensor are correlatively processed in correspondence with channels to obtain a first correlation state, and thereafter a correlation processing is performed while a predetermined channel is shifted, in order to obtain a second correlation state, and when said first and second correlation states are nearly identical, it is judged that said guide beam and said collimation direction have been aligned.

18. The guide beam direction setting apparatus as set forth in claim 14, further comprising:
   means for modulating said indicator beam;
   a wave detecting section for detecting a modulated light-received signal from said first photosensor and a modulated light-received signal from said second photosensor;
   an A/D conversion section for converting an analog signal output from said wave detecting section to a digital value; and
   an arithmetic processing section for processing data output from said A/D conversion section;
   wherein data from said first photosensor and data from said second photosensor are correlatively processed in correspondence with channels to obtain a first correlation state, and thereafter a correlation processing is performed while a predetermined channel is shifted, in order to obtain a second correlation state, and when said first and second correlation states are nearly identical, it is judged that said guide beam and said collimation direction have been aligned.

19. The guide beam direction setting apparatus as set forth in claim 14, wherein there are obtained a plurality of correlation states where a light-received signal from said first photosensor and a light-received signal from said second photosensor are shifted by the amount of a predetermined channel, and by using a result obtained when the obtained plurality of correlation states are interpolated, it is judged that said guide beam and said collimation direction have been aligned.

20. The guide beam direction setting apparatus as set forth in claim 14, further comprising:
   means for modulating said indicator beam;
   a wave detecting section for detecting a modulated light-received signal from said first photosensor and a modulated light-received signal from said second photosensor;
   an A/D conversion section for converting an analog signal output from said wave detecting section to a digital value; and
   an arithmetic processing section for processing data output from said A/D conversion section;
   wherein there are obtained a plurality of correlation states where data from said first photosensor and data from said second photosensor are shifted by the amount of a predetermined channel, and by using a result obtained when the obtained plurality of correlation states are interpolated, it is judged that said guide beam and said collimation direction have been aligned.

* * * * *